(12) United States Patent
Nonaka et al.

(10) Patent No.: US 10,072,324 B2
(45) Date of Patent: Sep. 11, 2018

(54) COLD-ROLLED STEEL SHEET AND METHOD FOR MANUFACTURING SAME, AND HOT-STAMP FORMED BODY

(71) Applicant: NIPPON STEEL & SUMITOMO METAL CORPORATION, Chiyoda-ku, Tokyo (JP)

(72) Inventors: Toshiki Nonaka, Tokyo (JP); Satoshi Kato, Tokyo (JP); Kaoru Kawasaki, Tokyo (JP); Toshimasa Tomokiyo, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 443 days.

(21) Appl. No.: 14/419,290

(22) PCT Filed: Aug. 5, 2013

(86) PCT No.: PCT/JP2013/071126
§ 371 (c)(1),
(2) Date: Feb. 3, 2015

(87) PCT Pub. No.: WO2014/024831
PCT Pub. Date: Feb. 13, 2014

(65) Prior Publication Data
US 2015/0225830 A1    Aug. 13, 2015

(30) Foreign Application Priority Data

Aug. 6, 2012  (JP) ................................ 2012-174215
Aug. 6, 2012  (JP) ................................ 2012-174216

(51) Int. Cl.
C22C 38/02    (2006.01)
C22C 38/04    (2006.01)
(Continued)

(52) U.S. Cl.
CPC .............. *C23C 2/02* (2013.01); *B32B 15/012* (2013.01); *B32B 15/013* (2013.01); *C21D 6/002* (2013.01);
(Continued)

(58) Field of Classification Search
None
See application file for complete search history.

(56) References Cited

U.S. PATENT DOCUMENTS 9,598,745 B2 *  3/2017  Hayashi ............... C21D 8/0226
2007/0023113 A1  2/2007  Ikeda et al.
(Continued)

FOREIGN PATENT DOCUMENTS

CA    2 782 777 A1    7/2011
CA    2 787 575 A1    8/2011
(Continued)

OTHER PUBLICATIONS

Search Report from European Patent Application No. 138277740.5, dated Mar. 16, 2016.
(Continued)

*Primary Examiner* — Deborah Yee
(74) *Attorney, Agent, or Firm* — Birch, Stewart, Kolasch & Birch, LLP

(57) ABSTRACT

A cold-rolled steel sheet has a predetermined chemical composition, in which a structure before and after a hot-stamping includes ferrite: 30 area % to 90 area %, martensite: 0 area % or more and less than 20 area %, pearlite: 0 area % to 10 area %, retained austenite: 5 volume % to 20 volume %, and rest structure: bainite, a hardness of the retained austenite measured with a nano indenter before and after the hot-stamping satisfies relations of H2/H1<1.1 and σHM<20, and a relation of TS×El≥20000 MPa·% is satisfied.

17 Claims, 4 Drawing Sheets

(51) Int. Cl.

| | | |
|---|---|---|
| C22C 38/06 | (2006.01) | |
| C21D 9/46 | (2006.01) | |
| C21D 8/02 | (2006.01) | |
| C21D 8/04 | (2006.01) | |
| C23C 2/02 | (2006.01) | |
| C22C 38/58 | (2006.01) | |
| C22C 38/00 | (2006.01) | |
| C22C 38/12 | (2006.01) | |
| C22C 38/14 | (2006.01) | |
| C22C 38/18 | (2006.01) | |
| B32B 15/01 | (2006.01) | |
| C21D 6/00 | (2006.01) | |
| C22C 38/16 | (2006.01) | |
| C22C 38/22 | (2006.01) | |
| C22C 38/26 | (2006.01) | |
| C22C 38/28 | (2006.01) | |
| C22C 38/32 | (2006.01) | |
| C22C 38/34 | (2006.01) | |
| C22C 38/38 | (2006.01) | |
| C22C 38/54 | (2006.01) | |
| C23C 2/06 | (2006.01) | |
| C23C 2/12 | (2006.01) | |
| C23C 2/26 | (2006.01) | |
| C23C 30/00 | (2006.01) | |
| C25D 5/36 | (2006.01) | |
| C25D 5/48 | (2006.01) | |
| C25D 7/00 | (2006.01) | |
| C21D 1/18 | (2006.01) | |
| C21D 9/48 | (2006.01) | |
| C21D 1/673 | (2006.01) | |

(52) U.S. Cl.
CPC ............ *C21D 6/004* (2013.01); *C21D 6/005* (2013.01); *C21D 6/008* (2013.01); *C21D 8/0226* (2013.01); *C21D 8/0236* (2013.01); *C21D 8/0263* (2013.01); *C21D 8/0278* (2013.01); *C21D 8/0426* (2013.01); *C21D 8/0436* (2013.01); *C21D 8/0473* (2013.01); *C21D 8/0478* (2013.01); *C21D 9/46* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/18* (2013.01); *C22C 38/22* (2013.01); *C22C 38/26* (2013.01); *C22C 38/28* (2013.01); *C22C 38/32* (2013.01); *C22C 38/34* (2013.01); *C22C 38/38* (2013.01); *C22C 38/54* (2013.01); *C22C 38/58* (2013.01); *C23C 2/06* (2013.01); *C23C 2/12* (2013.01); *C23C 2/26* (2013.01); *C23C 30/005* (2013.01); *C25D 5/36* (2013.01); *C25D 5/48* (2013.01); *C25D 7/00* (2013.01); *C21D 1/18* (2013.01); *C21D 1/673* (2013.01); *C21D 8/0442* (2013.01); *C21D 9/48* (2013.01); *C21D 2211/001* (2013.01); *C21D 2211/005* (2013.01); *C21D 2211/008* (2013.01); *Y10T 428/12757* (2015.01); *Y10T 428/12799* (2015.01)

(56) References Cited

U.S. PATENT DOCUMENTS

| | | |
|---|---|---|
| 2011/0162762 A1 | 7/2011 | Matsuda et al. |
| 2013/0032253 A1 | 2/2013 | Kariya et al. |

FOREIGN PATENT DOCUMENTS

| | | |
|---|---|---|
| CA | 2 862 257 A1 | 7/2013 |
| CA | 2 862 810 A1 | 7/2013 |
| CA | 2 862 829 A1 | 7/2013 |
| CA | 2 863 218 A1 | 7/2013 |
| CN | 101932746 A | 12/2010 |
| EP | 1380666 A1 | 1/2004 |
| EP | 1642990 A1 | 4/2006 |
| EP | 2 264 206 A1 | 12/2010 |
| EP | 2738276 A1 | 6/2014 |
| JP | 63-166934 | 7/1988 |
| JP | 06-128688 | 5/1994 |
| JP | 07-286213 | 10/1995 |
| JP | H11193439 A | 7/1999 |
| JP | 2000-319756 | 11/2000 |
| JP | 2001-152287 | 6/2001 |
| JP | 2002-069574 A | 3/2002 |
| JP | 2005-120436 | 5/2005 |
| JP | 2007-302918 A | 11/2007 |
| JP | 2007-314817 A | 12/2007 |
| JP | 2010-65292 A | 3/2010 |
| JP | 2011-102437 | 5/2011 |
| JP | 4714574 B2 | 6/2011 |
| JP | 2011-140695 A | 7/2011 |
| JP | 2011-157583 | 8/2011 |
| JP | 2011-256404 A | 12/2011 |
| KR | 10-2011-0042369 A | 4/2011 |
| RU | 2 312 162 C2 | 12/2007 |
| WO | 03-056041 A1 | 7/2003 |
| WO | 2008-053273 A1 | 5/2008 |
| WO | 2009-090443 A1 | 7/2009 |
| WO | WO 2011/132763 A1 | 10/2011 |
| WO | WO 2011/158818 A1 | 12/2011 |
| WO | 2013-018722 A1 | 2/2013 |

OTHER PUBLICATIONS

Canadian Office Action and Canadian Search Report, dated Jun. 27, 2016, for Canadian Application No. 2,879,540.

Korean Notice of Allowance, dated Jun. 29, 2016, for Korean Application No. 10-2015-7002907, along with an English translation.

Russian Office Action dated May 20, 2016 issued in Russian Patent Appliction No. 2015103482.

Office Action dated Dec. 21, 2015 in a corresponding Korean Application No. 10-2015-7002907.

Office Action dated Dec. 28, 2015 in a corresponding Chinese Application No. 201380041501.8

International Search Report dated Oct. 22, 2013 issued in corresponding PCT Application No. PCT/JP2013/071126 [with English Translation].

Office Action dated Oct. 20, 20134 issued in corresponding Taiwan Application No. 102127937 [with English Translation].

Search Report from European Patent Application No. 13827740.5, dated Mar. 16, 2016.

\* cited by examiner

COLD-ROLLED STEEL SHEET AND METHOD FOR MANUFACTURING SAME, AND HOT-STAMP FORMED BODY

TECHNICAL FIELD OF THE INVENTION

This application is a national stage application of International Application No. PCT/JP2013/071126, filed Aug. 5, 2013, which claims priority to Japanese Patent Application No. 2012-174215, filed Aug. 6, 2012, and Japanese Patent Application No. 2012-174216, filed Aug. 6, 2012, each of which is incorporated by reference in its entirety.

The present invention relates to a cold-rolled steel sheet, a hot-dip galvanized cold-rolled steel sheet, a galvannealed cold-rolled steel sheet, an electrogalvanized cold-rolled steel sheet, or an aluminized cold-rolled steel sheet, a hot-stamp formed body obtained by using the same, and a method for manufacturing the same.

RELATED ART

Currently, there is demand for improved collision safety and reduced weight in steel sheets used for vehicles. In order to achieve both improvement of collision safety and reduction in weight, a high-strength steel sheet has been developed in which the strength represented by tensile strength and the like is high. However, demand for a high-strength steel sheet has been increasing.

Given such circumstances, hot-stamping (also referred to as hot-pressing, hot-stamping, diequenching, or press-quenching) has recently attracted attention as a method for obtaining higher strength. Hot-stamping is a forming method in which a steel sheet is subjected to hot-forming after being heated at a high temperature, for example, 700° C. or higher, to improve the formability of the steel sheet and to quench the steel sheet by cooling, after the formation thereof, to obtain desired material properties. As a steel sheet having both press formability and high strength, a steel sheet having a martensite single-phase structure and a steel sheet having a multi-phase structure such as a ferrite-martensite structure or a ferrite-bainite structure are known. Among these, a composite-structure steel sheet in which martensite is dispersed in a ferrite matrix has a low yield ratio and superior ductility.

However, in recent steel sheets for a vehicle, the strength has increased, and complex forming has been performed. Therefore, when the strength of a recent composite-structure steel sheet is high, the ductility thereof is insufficient. Further, there is a case where an additional process may be performed on a formed body after hot-stamping or a case where impact absorbing ability may be expected from a formed body after hot-stamping. Therefore, recently, it has become necessary that the ductility of a formed body after hot-stamping be maintained to be high.

Such complex-structure steel sheets are disclosed in, for example, Patent Documents 1 to 3.

However, even with these techniques of the related art, it is difficult to satisfy the demands including further reduction in weight and complication of shapes of parts in recent vehicles. Further, in the steel sheets of the related art, it is difficult to maintain the ductility after hot-stamping to be high.

PRIOR ART DOCUMENT

Patent Document

[Patent Document 1] Japanese Unexamined Patent Application, First Publication No. H6-128688

[Patent Document 2] Japanese Unexamined Patent Application, First Publication No. 2000-319756

[Patent Document 3] Japanese Unexamined Patent Application, First Publication No. 2005-120436

DISCLOSURE OF THE INVENTION

Problems to be Solved by the Invention

An object of the invention is to provide a cold-rolled steel sheet for hot-stamping, a hot-dip galvanized cold-rolled steel sheet for hot-stamping, a galvannealed cold-rolled steel sheet for hot-stamping, an electrogalvanized cold-rolled steel sheet for hot-stamping, or an aluminized cold-rolled steel sheet for hot-stamping, and a method for manufacturing the same, in which the strength can be secured before and after hot-stamping, superior ductility can be obtained, and the formability is superior before and after hot-stamping. Further, another object of the invention is to provide a hot-stamp formed body having superior formability.

Means for Solving the Problem

The present inventors have thoroughly researched cold-rolled steel sheets, hot-dip galvanized cold-rolled steel sheets, galvannealed cold-rolled steel sheets, electrogalvanized cold-rolled steel sheets, and aluminized cold-rolled steel sheets, in which the strength can be secured before hot-stamping (before heating to perform quenching in hot-stamping) and after hot-stamping (after quenching in the hot-stamping), and the formability (ductility) is superior. As a result, the present inventors have found that a cold-rolled steel sheet capable of securing higher formability than the related art before and after hot-stamping can be industrially manufactured by controlling fractions of ferrite, bainite and retained austenite of a steel sheet before hot-stamping to be predetermined values, controlling a difference in the fraction of the retained austenite between a thickness surface portion and a thickness center portion of the steel sheet to be a specific range, and controlling a distribution of the retained austenite in the thickness center portion to be a specific range. This cold-rolled steel sheet may also be used as a galvanized cold-rolled steel sheet or an aluminized cold-rolled steel sheet. Further, the present inventors have found that, in order to obtain the above-described steel sheet, it is necessary to control the time before and after rough-rolling and the thickness of the steel sheet in a hot-rolling, and to control a rolling reduction in a cold rolling. Here, securing higher formability than the related art represents a product TS×El of tensile strength TS and ductility El being 20000 MPa·% or more. In addition, the present inventors have found that, in order to control the fraction of the retained austenite, it is effective to control the relationship between a duration from a time at which the steel sheet exits from a furnace to a time at which rough-rolling of the steel sheet starts and a duration from a time at which the rough-rolling of the steel sheet is finished to a time at which finish-rolling of the steel sheet starts to be in a specific range; and to control the relationship between the thicknesses of the steel sheet before and after rough-rolling to be in a specific range. Further, the present inventors have also found that a formed body obtained by forming such a steel sheet by hot-stamping is superior in ductility, and an additional working such as drawing is easily performed on the formed body. Based on the above findings, the present inventors have conceived the following various aspects of the invention.

(1) In a cold-rolled steel sheet according to an aspect of the invention, a chemical composition includes, in terms of mass %: C: 0.1% to 0.3%; Si: 0.01% to 2.0%; Mn: 1.5% to 2.5%; P: 0.001% to 0.06%; S: 0.001% to 0.01%; N: 0.0005% to 0.01%; Al: 0.01% to 0.05%; B: 0% to 0.002%; Mo: 0% to 0.5%; Cr: 0% to 0.5%; V: 0% to 0.1%; Ti: 0% to 0.1%; Nb: 0% to 0.05%; Ni: 0% to 1.0%; Cu: 0% to 1.0%; Ca: 0% to 0.005%; REM: 0% to 0.005%; and rest including Fe and impurities, a structure before and after a hot-stamping includes a ferrite: 30 area % to 90 area %, a martensite: 0 area % or more and less than 20 area %, a pearlite: 0 area % to 10 area %, a retained austenite: 5 volume % to 20 volume %, and rest structure: a bainite, a hardness of the retained austenite measured with a nano indenter before and after the hot-stamping satisfies Expression 1 and Expression 2, a tensile strength and a ductility satisfy a relation of TS×El≥20000 MPa·%, $$H2/H1 < 1.1: \quad \text{Expression 1,}$$

$$\sigma HM < 20: \quad \text{Expression 2,}$$

and the "H1" represents the hardness of the retained austenite existing within a thickness surface portion before and after the hot-stamping, the thickness surface portion being an area within 200 μm in the thickness direction of a surface of the cold-rolled steel sheet, the "H2" represents the hardness of the retained austenite existing within a thickness center portion before and after the hot-stamping, the thickness center portion being an area within ±100 μm along the thickness direction of a center plane of the cold-rolled steel sheet in the thickness direction, the "σHM" represents a variance of the hardness of the retained austenite within the thickness center portion before or after the hot-stamping, "TS" represents the tensile strength of the cold-rolled steel sheet in terms of MPa, and "El" represents the ductility of the cold-rolled steel sheet in terms of %.

(2) In the cold-rolled steel sheet according to (1), the chemical composition may include one or more elements selected from a group consisting of, in terms of mass %: B: 0.0005% to 0.002%; Mo: 0.01% to 0.5%; Cr: 0.01% to 0.5%; V: 0.001% to 0.1%; Ti: 0.001% to 0.1%; Nb: 0.001% to 0.05%; is 0.01% to 1.0%; Cu: 0.01% to 1.0%; Ca: 0.0005% to 0.005%; and REM: 0.0005% to 0.005%.

(3) In the cold-rolled steel sheet according to (1) or (2), a hot-dip galvanized plating may be formed on the surface of the cold-rolled steel sheet.

(4) In the cold-rolled steel sheet according to (1) or (2), a galvannealed plating may be formed on the surface of the cold-rolled steel sheet.

(5) In the cold-rolled steel sheet according to (1) or (2), an electrogalvanized plating may be formed on the surface of the cold-rolled steel sheet.

(6) In the cold-rolled steel sheet according to (1) or (2), an aluminum plating may be formed on the surface of the cold-rolled steel sheet.

(7) A method according to another aspect of the invention for manufacturing the cold-rolled steel sheet according to (1) or (2) including: casting a molten steel having the chemical composition into a steel; hot-rolling after the casting, in which heating is performed on the steel in a furnace, and then rough-rolling and finish-rolling are performed on the steel under a condition satisfying Expression 3; coiling the steel after the hot-rolling; pickling the steel after the coiling; cold-rolling the steel after the pickling with a cold-rolling mill having a plurality of stands under a condition satisfying Expression 4; annealing after the cold-rolling, in which annealing is performed on the steel at 700° C. to 850° C., and then the steel is cooled; temper-rolling the steel after the annealing, in which $$2 < (1/5) \times (h1/h2) \times (1/10) \times (t1+t2)^{0.3} < 6: \quad \text{Expression 3,}$$

$$1.5 \times (r1/r) + 1.2 \times (r2/r) + (r3/r) > 1: \quad \text{Expression 4,}$$

and

"h1" represents a thickness of the steel before the rough-rolling in terms of mm, "h2" represents the thickness of the steel after the rough-rolling in terms of mm, "t1" represents a duration from a time at which the steel exits the furnace to a time at which the rough-rolling of the steel starts in terms of seconds, "t2" represents a duration from a time at which the rough-rolling is finished to a time at which the finish-rolling starts in terms of seconds, and "ri" represents an individual target cold-rolling reduction of an $i_{th}$ stand (i=1, 2, 3 . . . ) from a first stand along the plurality of the stands in terms of %, and "r" represents a total target cold-rolling reduction in the cold-rolling in terms of %.

(8) The method according to (7) for manufacturing the cold-rolled steel sheet according to (3), may include hot-dip galvanizing between the annealing and the temper-rolling, in which the hot-dip galvanized plating is formed on the steel.

(9) The method according to (8) for manufacturing the cold-rolled steel sheet according to (4), may include galvannealing between the hot-dip galvanizing and the temper-rolling, in which the steel is galvannealed.

(10) The method according to (7) for manufacturing the cold-rolled steel sheet according to (5), may include electrogalvanizing after the temper-rolling, in which the electrogalvanized plating is formed on the steel.

(11) The method according to (7) for manufacturing the cold-rolled steel sheet according to (6), may include aluminizing between the annealing and the temper-rolling, in which the aluminum plating is formed on the steel.

(12) A hot-stamp formed body according to still another aspect of the invention is obtained by using the cold-rolled steel sheet according to any one of (1) to (6).

Effects of the Invention

According to the invention, a hardness distribution hardness distribution at the thickness center portion, and a difference in hardness between the thickness surface portion and the thickness center portion) of the retained austenite measured with a nano indenter is controlled to be appropriate before and after hot-stamping. Therefore, superior ductility can be obtained. Accordingly in a formed body manufactured by hot-stamping, superior ductility can be obtained before and after hot-stamping.

EMBODIMENTS OF THE INVENTION

Figure 1A:
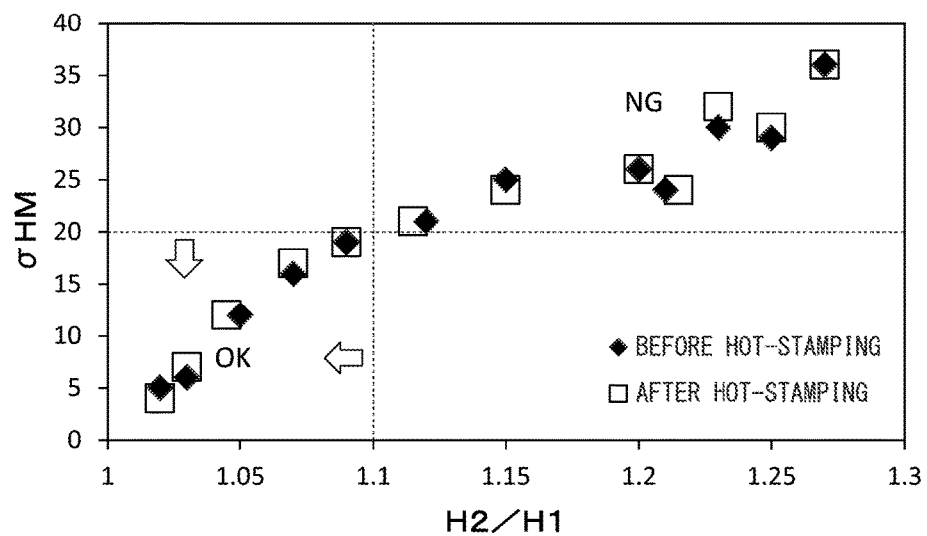
FIG. 1A is a graph showing a relationship between H2/H1 and σHM before and after hot-stamping.

It was found that, as described above, in order to improve the formability of the steel sheet before and after hot-stamping, it is important to control the hardness distribution of the retained austenite at a predetermined position of the steel sheet (the hardness distribution at the thickness center portion, and the difference in hardness between the thickness surface portion and the thickness center portion) to be appropriate. Research regarding the relationship between the formability of the steel sheet before and after hot-stamping and the hardness of the retained austenite has yet to be conducted.

Here, a steel sheet according to an embodiment of the invention and the reason for limiting the chemical components of steel used for manufacturing the steel sheet will be described. Hereinafter, "%" which is the unit indicating the content of each component represents "mass %".

(C: 0.1% to 0.3%)

C is an important element to stably remain austenite. When the C content is less than 0.1%, it is not possible to sufficiently remain the austenite. On the other hand, when the C content is more than 0.3%, the weldability of the steel sheet decreases. Accordingly, the range of the C content is set to 0.1% to 0.3%. When the demand for weldability is high, the C content is preferably set to 0.25% or less.

(Si: 0.01% to 2.0%)

Si is an important element for suppressing the formation of harmful carbides and for deoxidation. However, when the Si content is more than 2.0%, the ductility of the steel sheet decreases, and the chemical conversion treatability of the steel sheet also decreases. Accordingly, the upper limit of the Si content is set to 2.0%. In addition, when the Si content is less than 0.01%, the deoxidation effect cannot be sufficiently obtained. Accordingly, the lower limit of the Si content is set to 0.01%.

(Al: 0.01% to 0.05%)

Al is important as a deoxidizer. For this purpose, the lower limit of the Al content is set to 0.01%. On the other hand, even when the Al content is excessively large, the above effect is saturated, and conversely, the steel is embrittled. Accordingly, the upper limit of the Al content is set to 0.05%.

(Mn: 1.5% to 2.5%)

Mn is an important element for improving hardenability to strengthen the steel sheet. When the Mn content is less than 1.5%, the strength of the steel sheet cannot be sufficiently improved. However, when the Mn content is more than 2.5%, the hardenability of the steel sheet is increased more than necessary, and the strength is increased in an unfavorable amount, which leads to a decrease in ductility. Accordingly, the Mn content is set to 1.5% to 2.5%. When the demand for ductility is high, the upper limit of the Mn content is preferably set to 2.0%.

(P: 0.001% to 0.06%)

When the P content is large. P is segregated in a grain boundary, and the local ductility and the weldability of the steel sheet deteriorate. Accordingly, the upper limit of the P content is set to 0.06%. On the other hand, an unnecessary decrease in the P content causes an increase in the cost during refinement. Therefore, the lower limit of the P content is set to 0.001%.

(S: 0.001% to 0.01%)

S is an element which forms MnS with Mn and significantly decreases the local ductility and the weldability of the steel sheet. Accordingly, the upper limit of the S content is set to 0.01%. In addition, due to the refinement cost, the lower limit of the S content is preferably set to 0.001%.

(N: 0.0005% to 0.01%)

N is important for precipitating nitrides such as AlN to refine crystal grains of a structure of the steel sheet. However, when N content is more than 0.01%, solid-solution N remains and thus the ductility of the steel sheet decreases. Accordingly, the upper limit of the N content is set to 0.01%. In addition, in order to refine the crystal gains of the structure and to reduce the cost during refinement, the lower limit of the N content is preferably set to 0.0005%.

(Nb: 0% to 0.05%, Ti: 0% to 0.1%, V: 0% to 0.1%, Mo: 0% to 0.5%, Cr: 0% to 0.5%)

The steel sheet according to the embodiment does not necessarily include Nb, Ti, V, Mo, and Cr. Accordingly, the lower limits of the contents of these elements are 0%. However, Nb, Ti, and V are precipitated as fine carbonitrides and strengthen the steel. In addition, Mo and Cr improve the hardenability of the steel sheet and strengthen the steel. In order to obtain these effects, the steel sheet may include one element or two or more elements selected from among Nb: 0.001% or more, Ti: 0.001% or more, V: 0.001% or more, Mo: 0.01% or more, and Cr: 0.01% or more. On the other hand, it is necessary that the upper limit of the Nb content be set to 0.05%, the upper limit of the Ti content be set to 0.1%, the upper limit of the V content be set to 0.1%, the upper limit of the Mo content be set to 0.5%, and the upper limit of the Cr content be set to 0.5%. When the steel sheet contains these elements in amounts more than the upper limits, the effect of increasing the strength is saturated, and the ductility decreases.

(Ca: 0% to 0.005%, REM: 0% to 0.005%)

The steel sheet according to the embodiment does not necessarily include Ca and REM (rare earth element). Accordingly, the lower limits of the contents of these elements are 0%. However, Ca controls the shapes of sulfides and nitrides to improve the local ductility and the hole expansibility of the steel. In order to obtain this effect, the Ca content may be set to 0.0005% or more. However, when the Ca content is excessively large, the workability of the steel deteriorates. Accordingly, the upper limit of the Ca content is set to 0.005%. When being included in the steel, REM exhibits the same effect as Ca. For the same reason as Ca, the lower limit of the REM content may be set to 0.0005%, and the upper limit thereof is necessarily set to 0.005%.

REM refers to a collective term for 17 elements including 15 lanthanoid elements, Y, and Sc. Among these elements, one element or two or more elements may be included in the steel sheet. The REM content refers to the total content of these elements.

(Cu: 0% to 1.0%, Ni: 0% to 1.0%, B: 0% to 0.002%)

The steel sheet according to the embodiment does not necessarily include Cu, Ni, and B. Accordingly, the lower limits of the contents of these elements are 0%. However, these elements also improve hardenability and increase the strength of the steel. Accordingly, in order to obtain these effects, the lower limit of the Cu content may be set to 0.01%, the lower limit of the Ni content may be set to 0.01%, and the lower limit of the B content may be set to 0.0005%.

On the other hand, it is necessary that the upper limit of the Cu content be set to 1.0%, the upper limit of the Ni content be set to 1.0%, and the upper limit of the B content be set to 0.002%. When the steel sheet includes these elements in amounts more than the upper limits, the effect of increasing the strength is saturated, and the ductility of the steel decreases.

(Rest: Fe and Impurity)

The rest of the steel according to the embodiment includes Fe and impurity. Here, the impurity refers to elements which are, when the steel is industrially manufactured, incorporated from raw materials such as ore or scrap or incorporated by various factors of the manufacturing process, and the impurity is allowed to be included in the steel in a range not adversely affecting the steel. Examples of the impurity elements include Sn and As.

(Hardness Distribution of Retained Austenite in Thickness Center Portion of Steel Sheet: σHM<20 before and after Hot-Stamping)

(Difference in Hardness of Retained Austenite between Thickness Center Portion and Thickness Surface Portion of Steel Sheet: H2/H1<1.1)

When the steel includes the retained austenite, the ductility of the steel is improved. However, in order to stably retain the retained austenite, it is necessary that the C content be optimum. However, when the steel sheet is actually manufactured, the C content in the steel sheet varies between the thickness surface portion and the thickness center portion in many cases. Specifically, when the C content in the thickness surface portion is small, the amount of the retained austenite is insufficient, and when the C content in the thickness center portion is large, the retained austenite is decomposed, and cementite is precipitated. As a result, the ductility of the steel sheet deteriorates. In order to improve the ductility of the steel sheet by the steel sheet including the retained austenite, it is necessary to solve such a problem.

Figure 1B:
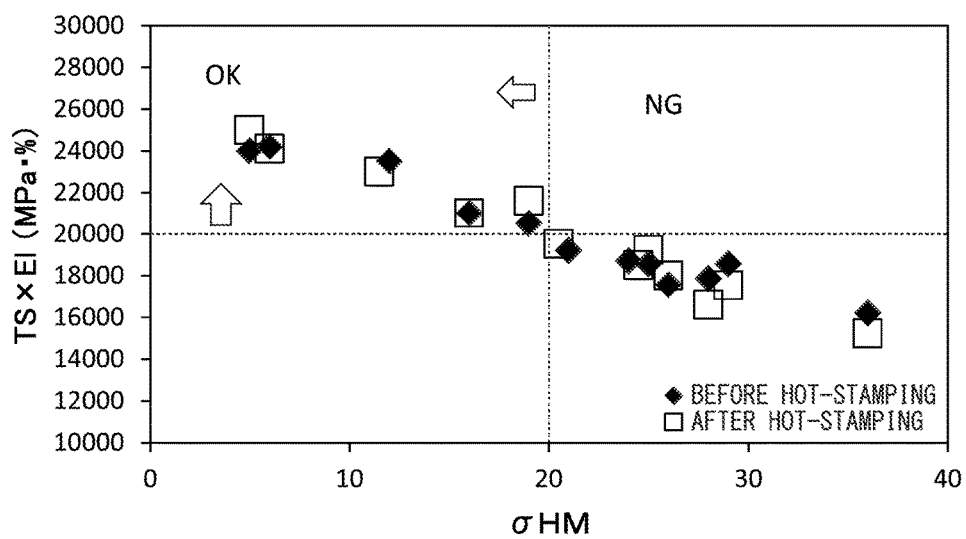
FIG. 1B is a graph showing a relationship between σHM and TS×El before and after hot-stamping and showing a basis for Expressions 1 and 2.

The present inventors have thoroughly studied the hardness of retained austenite and have found the following: as shown in FIGS. 1A and 1B, when a difference in the hardness of the retained austenite between the thickness surface portion and the thickness center portion (hardness ratio) before and after hot-stamping is in a predetermined state, and when a hardness distribution of the retained austenite of the thickness center portion (variance) is as predetermined state, the formability such as ductility is superior. Further, the present inventors have found that, even after quenching in hot-stamping, the C distribution included in the steel is substantially maintained, and the formability such as ductility is maintained to be high. The reason is considered to be as follows: the hardness distribution of the retained austenite formed before hot-stamping has a large influence even after hot-stamping such that C, which is rich in the thickness center portion, maintains its rich state in the center part even after hot-stamping. Therefore, when a difference in the hardness of the retained austenite between the thickness surface portion and the thickness center portion is large and a variance thereof is large in the steel sheet before hot-stamping, the steel sheet after hot-stamping shows the same tendency.

The present inventors have found that, in the embodiment, when the hardness of the retained austenite measured with a nano indenter (manufactured by Hysitron Corporation) at a magnification of 1000 times before and after the hot-stamping satisfies Expression 1 and Expression 2, a steel sheet and a hot-stamp formed body having superior formability can be obtained. Here, "H1" represents the hardness of the retained austenite existing within the thickness surface portion which is the area within 200 μm in the thickness direction of the outermost surface of the steel sheet, "H2" represents the hardness of the retained austenite existing within the thickness center portion which is the area within ±100 arm along the thickness direction of a center plane of the steel sheet in the thickness direction, and "σHM" represents a variance of the hardness of the retained austenite within the thickness center portion. The hardness of the retained austenite at each of 300 points is measured. Since the hardness measured by the nano indenter is a dimensionless parameter, a unit is not assigned to this hardness measurement.

$$H2/H1 < 1.1: \quad \text{Expression 1}$$

$$\sigma HM < 20: \quad \text{Expression 2}$$

FIG. 1A is a graph showing a relationship between H2/H1 and σHM before and after hot-stamping, and FIG. 1B is a mph showing a relationship between σHM and TS×El before and after hot-stamping. FIG. 1A and FIG. 1B show a basis for Expressions 1 and 2. It can be seen from FIG. 1A that, in the steel sheet in which H2/H1 is less than 1.1, σHM is less than 20. Further, it also can be seen from FIG. 1A that the values of H2/H1 and σHM do not largely change before and after hot-stamping. Furthermore, it can be seen from FIG. 1B that, when σHM is less than 20, TS×El is more than 20000 MPa·% which is the target of the embodiment.

The value of H2/H1 being 1.1 or more represents the hardness of the retained austenite of the thickness center portion being 1.1 times or more of the hardness of the retained austenite of the thickness surface portion. When H2/H1 is 1.1 or more before and after hot-stamping, as shown in FIG. 1A, σHM is 20 or more before and after hot-stamping. In this case, the hardness of the thickness center portion excessively increases, TS×El<20000 MPa·%, and sufficient formability cannot be obtained before and after hot-stamping.

In the invention, "H2/H1 being 1.1 or more before and after hot-stamping" represents H2/H1 being 1.1 or more before hot-stamping and H2/H1 being 1.1 or more after hot-stamping. A ratio of H2 after hot-stamping to H1 before hot-stamping, or a ratio of H2 before hot-stamping to H1 after hot-stamping is not calculated.

The variance σHM being 20 or more represents a large variation in the hardness of the retained austenite. That is, when the variance σHM is 20 or more a portion having a locally excessively high hardness is present in the steel sheet. In this case, TS×El<20000 MPa·%, and sufficient formability cannot be obtained before and after hot-stamping.

In the embodiment, the hardness of the retained austenite is measured with the nano indenter at a magnification of 1000 times. Since an indentation formed in a Vickers hardness test is larger than the retained austenite, the hardness (Vickers hardness) obtained in the Vickers hardness test indicates the macroscopic hardness of the retained austenite and peripheral structures thereof (for example, ferrite). Accordingly, in the Vickers hardness test, the hardness of the retained austenite itself cannot be obtained. Since formability (ductility) is largely affected by the hardness of the retained austenite itself, the Vickers hardness is insufficient as an index for evaluating formability. On the other hand, in the hardness measurement by the nano indenter, the hardness of the retained austenite itself can be measured. This is because, by adjusting settings during the hardness measurement, the size of an indentation formed in the hardness measurement by the nano indenter can be reduced to be smaller than the size of the retained austenite. By using the hardness obtained by the nano indenter as an evaluation index, the formability of the steel sheet can be evaluated more accurately. In the embodiment, since the relationship regarding the hardness of the retained austenite before and after hot-stamping which is measured by the nano indenter is appropriate, extremely superior formability can be obtained.

(Area Ratio of Ferrite: 30% to 90% before and after Hot-Stamping, Area Ratio of Pearlite: 0% to 10% before and after Hot-Stamping, Area Ratio of Martensite: 0% or more and less than 20% before and after Hot-Stamping, Volume Ratio of Retained Austenite: 5% to 20% before and after Hot-Stamping, and Rest Structure: Bainite before and after Hot-Stamping)

In the embodiment, an area ratio of ferrite in the structure before and after hot-stamping is 30% to 90%. When the area ratio of ferrite is less than 30%, sufficient ductility cannot be obtained. On the other hand, when the area ratio of ferrite is more than 90%, the hard phase is insufficient, and sufficient strength cannot be obtained. Accordingly, the area ratio of ferrite is set to 10% to 90%.

The structure before and after hot-stamping also includes the retained austenite. In the embodiment, the volume ratio of the retained austenite is set to 5% to 20%. By 0.5% or more of the retained austenite being present in the steel sheet, ductility is secured. It is not necessary to define the upper limit of the volume ratio of the retained austenite. However, the upper limit of the area ratio of the retained austenite is set to about 20% in consideration of, for example, the capacity of an actual manufacturing facility.

The structure before and after hot-stamping may include martensite. In this case, the area ratio of martensite is less than 20%. This is because, when a steel sheet is manufactured under a manufacturing condition where the structure includes 5 volume % to 20 volume % of the retained austenite, the structure cannot include 20 area % or more of martensite.

As described above, in the embodiment, major portions of the structure before and after hot-stamping are occupied by ferrite and the retained austenite, and the structure may further include martensite. In addition, in the embodiment, it is preferable that the structure before and after hot-stamping does not include pearlite. Pearlite is a hard and brittle structure. Therefore, when the structure includes more than 10 area % of pearlite, the tensile strength and the ductility of the steel sheet may decrease. Accordingly, the area ratio of pearlite is set to 0% to 10%.

In the embodiment, the rest (rest structure) of the structure before and after hot-stamping mainly includes bainite.

The content of each structure is measured using the following method. The area ratios of ferrite, bainite, and pearlite can be obtained by cutting the steel sheet in a direction perpendicular to a rolling direction, polishing the cut surface, exposing the structure of the cut surface by nital etching, and observing a thickness ¼ portion of the cut surface at a magnification of 1000 times. The area ratio of martensite can be obtained by cutting the steel sheet in a direction perpendicular to a rolling direction, polishing the cut surface, exposing the structure of the cut surface by Le Pera etching, and observing a thickness ¼ portion of the cut surface at a magnification of 1000 times. The volume ratio of the retained austenite can be obtained by polishing a region of the steel sheet from the surface to the thickness ¼ portion and measuring the steel sheet using an X-ray diffractometer. The thickness ¼ portion refers to a part of the steel sheet at a distance of ¼ of the thickness of the steel sheet from the surface in the thickness direction of the steel sheet.

When hot-stamping is performed on such a steel sheet, a tensile strength of 500 MPa to 1500 MPa can be realized in the steel sheet after hot-stamping. In addition, by satisfying the above-described conditions, an effect of significantly improving formability can be obtained, particularly, in a steel sheet having a tensile strength of about 550 MPa to 1200 MPa.

On the surface of the cold-rolled steel sheet according to the embodiment, a galvanized plating, for example, a hot-dip galvanized plating, a galvannealed plating, an electrogalvanized plating, or an aluminum plating may be formed to obtain a hot-dip galvanized cold-rolled steel sheet, a galvannealed cold-rolled steel sheet, an electro galvanized cold-rolled steel sheet, or an aluminized cold-rolled steel sheet. The formation of such a plating is preferable from the viewpoint of corrosion resistance.

Hereinafter, a method for manufacturing the steel sheet according to the embodiment will be described.

(Casting S1)

When the steel sheet according to the embodiment is manufactured, a molten steel melted in a converter is continuously cast into a slab (steel) under ordinary conditions. During the continuous casting, when the casting speed is fast, a precipitate such as Ti is too fine. On the other hand, when the casting speed is slow, the productivity is poor, the above-described precipitate is coarsened, and the number of particles is small. As a result, properties such as delayed fracture resistance may not be controlled. Therefore, the casting speed is preferably set to 1.0 m/min to 2.5 m/min.

(Hot-Rolling S2)

The slab after the casting may be heated in a furnace such as a tunnel kiln and then may be provided for hot-rolling, directly. Alternatively, when the slab is cooled to lower than 1100° C., the slab can be reheated in a furnace such as a tunnel kiln. Irrespective of whether or not the slab is cooled, the temperature of the slab exited from the furnace is preferably set to 1100° C. to 1300° C. When the hot-rolling starts at a temperature of lower than 1100° C., it is difficult to secure a finishing temperature, Which may cause a decrease in the ductility of the steel sheet. In addition, in a steel sheet to which Ti and/or Nb is added, the melting of the precipitate during heating is insufficient, which may cause a decrease in the strength of the steel sheet. On the other hand, when the heating temperature is higher than 1300° C., the amount of scale: formed is large, and surface properties of the steel sheet may not be superior.

Figure 2:
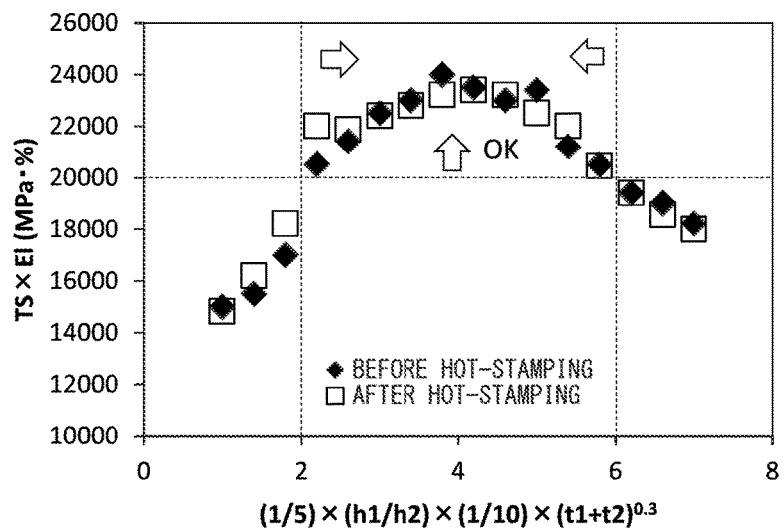
FIG. 2 is a graph showing a relationship between Expression 3 relating to hot-rolling conditions and TS×El before and after hot-stamping and showing a basis for Expression 3.

Next, rough-rolling and finish-rolling are performed under a condition by which the following Expression 3 is established. In the embodiment, "hot-rolling" includes the heating, the rough-rolling, and the finish-rolling. As shown in FIG. 2, in a steel sheet which is manufactured by performing the rolling under the condition satisfying Expression 3, TS×El≥20000 MPa·% is satisfied before and after hot-stamping. Here, "t1" represents a duration from a time at which the slab exits from the furnace to a time at which rough-rolling of the slab starts in the hot-rolling in terms of seconds, "t2" represents a duration from a time at which rough-rolling is finished to a time at which finish-rolling starts in terms of seconds, "h1" represents a thickness of the slab before the rough-rolling, and "h2" represents a thickness of the slab after the rough-rolling.

$$2 < (1/5) \times (h1/h2) \times (1/10) \times (t1+t2)^{0.3} < 6: \qquad \text{Expression 3}$$

When the hot-rolling is performed under the condition satisfying Expression 3, a band where a laminated concentration difference of alloy elements such as C and Mn is generated is divided. As a result, in the steel sheet after annealing, a bias of the C concentration of the retained austenite is eliminated. As described above, it is known that, when the C concentration of the retained austenite is not uniform and varies, the ductility is poor. When the hot-rolling is performed such that Expression 3 is established, the C concentration of the retained austenite is uniform, and a steel sheet having superior ductility can be obtained.

This Expression 3 is experimentally obtained to evaluate a relation between the sheet thickness before and after the rolling and the time from the rough-rolling to the finish-rolling; and a rolling load during the finish-rolling and the division (fragmentation) of pearlite caused by the rolling load.

Following the rough-rolling, the finish-rolling of the hot-rolling is performed at a finishing temperature of, preferably, $Ar_3$ to 970° C. When the finishing temperature is lower than $Ar_3$, ($\alpha+\gamma$) dual-phase rolling is performed, which may cause a decrease in ductility. In addition, when the finishing temperature is higher than 970° C., the austenite grain size is large, and the fraction of ferrite decreases. As a result, the ductility may decrease.

(Coiling S3)

After the hot-rolling, the steel is cooled at an average cooling rate of, preferably, 20° C./sec or faster and is coiled at a predetermined coiling temperature CT. When the average cooling rate is slower than 20° C./sec, pearlite which causes a decrease in ductility may be excessively formed.

(Pickling S4 and Cold-Rolling S5)

Figure 3:
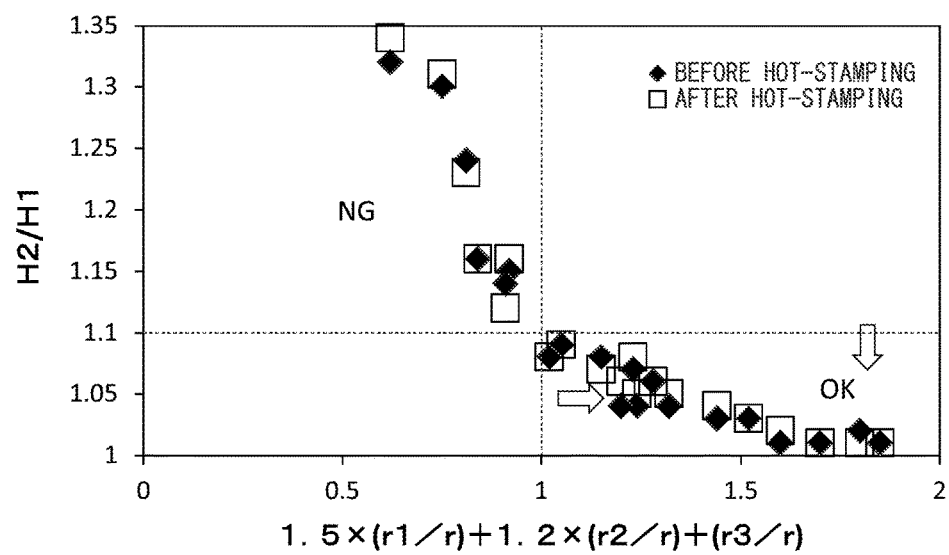
FIG. 3 is a graph showing a relationship between Expression 4 relating to a cold-rolling reduction and hardness H2/H1 before and after hot-stamping and showing a basis for Expression 4.

After the coiling, the steel sheet is pickled. After the pickling, in cold-rolling, the steel sheet is cold-rolled with a cold-rolling mill having multiple stands. When the steel sheet is cold-rolled under a condition satisfying the following Expression 4 as shown in FIG. 3, a steel sheet which satisfies the above-described Expression 1 can be obtained. The steel sheet satisfying Expression 1 leads to not only the steel sheet before hot-stamping satisfying TS×El≥20000 MPa·% but also the steel sheet even after hot-stamping satisfying TS×El≥20000 MPa·%. Here, "ri" represents an individual target cold-rolling reduction of $i_{th}$ stand (i=1, 2, 3 . . . ) from a first stand along the plural stands in the cold-rolling, and "r" represents a total target cold-rolling reduction (%) in the cold-rolling. The total rolling reduction refers to percentage of a cumulative rolling reduction amount (a difference between an inlet sheet thickness before an initial pass and an outlet sheet thickness after a final pass) to an inlet sheet thickness of the first stand and may also be referred to as a cumulative rolling reduction.

$$1.5 \times (r1/r) + 1.2 \times (r2/r) + (r3/r) > 1:$$ Expression 4

When the cold-rolling is performed under the condition satisfying Expression 4, even if large pearlite is present in the steel sheet before the cold-rolling, pearlite can be sufficiently divided (fragmented) in the cold-rolling. As a result, by the annealing after the cold-rolling, pearlite can be eliminated, or the amount of pearlite can be suppressed to the minimum. Therefore, a structure which satisfies Expressions 1 and 2 can be easily obtained. On the other hand, when Expression 4 is not established, a cold-rolling reduction in an upstream stand is insufficient, coarse pearlite is likely to remain, and the desired retained austenite cannot be formed in subsequent annealing. In addition, the present inventors have found that, by satisfying Expression 4, the form of the obtained retained austenite structure after annealing can be maintained to be the same even after hot-stamping, and the ductility is superior even after hot-stamping. When the steel sheet according to the embodiment is heated until the dual-phase in hot-stamping, the retained austenite and the hard phase before the hot-stamping are transformed into an austenite structure, and ferrite before the hot-stamping is maintained as it is. C (carbon) in austenite does not move to peripheral ferrite. Next, after cooling, austenite is transformed into the hard phase including martensite. That is, when Expression 4 is satisfied and the above-described H2/H1 is in the predetermined range, this state is maintained as it is even after hot-stamping, and thus formability after hot-stamping is superior.

As described r, r1, r2, and r3 are target cold-rolling reductions, and typically the cold-rolling is performed with controlling an actual cold-rolling reduction to be the same as the target cold-rolling reduction. It is not preferable that the cold-rolling is performed with a difference between the target cold-rolling reduction and the actual cold-rolling reduction. Accordingly, when the actual cold-rolling reduction satisfies the above-described Expression 4, it should be seen that the invention is embodied. The actual cold-rolling reduction is preferably within ±10% of the target cold-rolling reduction.

(Annealing S6 and Temper-Rolling S7)

After the cold-rolling, the steel sheet is annealed to be recrystallized. By this annealing, desired martensite is formed. An annealing temperature is preferably in a range of 700° C. to 850° C. By annealing the steel sheet in this range, ferrite and martensite have a desired area ratio, which can contribute to the improvement of TS×El. In the subsequent temper-rolling, the steel sheet is temper-rolled using a known technique.

Further, in order to improve corrosion resistance, the manufacturing method according to the embodiment may include a hot-dip galvanizing, in which the hot-dip galvanized plating is formed on the surface of the cold-rolled steel sheet, between the annealing and the temper-rolling. Further, the manufacturing method may include a galvannealing after the hot-dip galvanized plating, in which the cold-rolled steel sheet is galvannealed. When the steel sheet is galvannealed, a treatment of increasing the thickness of an oxide film on the plating surface may be further performed, in which the galvannealed plating surface is brought into contact with a material, such as water vapor, for oxidizing the plating surface.

In addition to the hot-dip galvanizing and the galvannealing, the manufacturing method according to the embodiment may include, for example, an electrogalvanizing after the temper-rolling, in which the electrogalvanized plating is formed on the surface of the cold-rolled steel sheet. In addition, instead of the hot-dip galvanizing, the manufacturing method according to the embodiment may include an aluminizing between the annealing and the temper-rolling, in which the aluminum plating is formed on the surface of the cold-rolled steel sheet. As a method for aluminizing, a hot-dip aluminizing is typically used and is preferable.

By hot-stamping the steel sheet after such a series of processing, a hot-stamp formed body (steel sheet after hot-stamping) can be obtained. The hot-stamping is preferably performed, for example, under the following conditions. First, the steel sheet is heated to 700° C. or higher at a temperature increase rate of 5° C./sec or faster. In order to improve the formability of the steel sheet, the heating temperature is preferably 1000° C. or lower and particularly preferably $Ac_3$ point or lower. After the heating is finished, hot-stamping is performed after a predetermined holding time. Next the steel sheet is cooled to be in a range of 300° C. to 500° C. at a cooling rate of 50° C./sec or faster. Next, the temperature of the steel sheet is held in a range of 300° C. to 500° C. for 100 seconds or longer (quenching in the hot-stamping).

When the heating temperature before the hot-stamping is lower than 700° C., the strength of the steel sheet may not be secured due to insufficient quenching. On the other hand, when the heating temperature is higher than 1000° C., the steel sheet may be excessively softened. In addition, when a plating is formed on the surface of the steel sheet, particularly, when a galvanized plating is formed thereon, it is not preferable that the heating temperature be higher than 1000° C. because zinc may be evaporated and disappears. Accordingly, the heating temperature of the hot-stamping is preferably 700° C. or higher and 1000° C. or lower. In order to further suppress undesirable changes of the structure, it is particularly preferable that the upper limit of the heating temperature be set to $Ac_3$ point. Typically, the $Ac_3$ point is calculated from the following Expression 5.

$$Ac_3 = 937.2 - 436.5 \times [C] + 56 \times [Si] - 19.7 \times [Mn] - 16.3 \times [Cu] - 26.6 \times [Ni] - 4.9 \times [Cr] + 38.1 \times [Mo] + 124.8 \times [V] + 136.3 \times [Ti] - 19.1 \times [Nb] + 198.4 \times [Al] + 3315 \times [B]: \quad \text{Expression 5}$$

[C], [Si], [Mn], [Cu], [Ni], [Cr], [Mo], [V], [Ti], [Nb], [Al], and [B] indicate the contents of C, Si, Mn, Cu, Ni, Cr, Mo, V, Ti, Nb, Al, and B in the steel, respectively, in terms of mass %.

When the temperature increase rate before the hot-stamping is slower than 5° C./sec, it is difficult to control the temperature increase rate, and the productivity significantly decreases. Therefore, it is preferable that the heating is performed at a temperature increase rate of 5° C./sec or faster. When the cooling rate is slower than 50° C./sec, it is difficult to control the cooling rate, and the productivity significantly decreases. Therefore, it is preferable that the cooling is performed at a cooling rate of 50° C./sec or faster. The upper limits of the temperature increase rate and the cooling rate are not particularly defined. In a range of the typical capacity of the existing facility, the upper limits of both the temperature increase rate and the cooling rate are about 500° C./sec. However, in the future, the development of a facility where heating and/or cooling can be performed at a high speed is estimated. In this case, heating and/or cooling may be performed at a rate of 500° C./sec or faster.

The reason why the temperature of the steel sheet is held in a range of 300° C. to 500° C. for 100 seconds or longer is that austenite is made to remain even after cooling to normal temperature by promoting bainite transformation to concentrate C in untransformed austenite.

As a result, by satisfying the above-described conditions, a high-strength steel sheet can be manufactured in which the hardness distribution and the structure can be maintained before and after hot-stamping, the strength can be secured, and superior ductility can be obtained.

EXAMPLES

Steels having various components shown in Table 1 were continuously cast into slabs at a casting speed of 1.0 m/min to 2.5 m/min. These slabs after casting were directly heated in a furnace using an ordinary method or were temporarily cooled and then heated in a furnace using an ordinary method. In Table 2, Symbol "-" represents that the corresponding element is not intentionally included in the corresponding steel. These slabs were hot-rolled under conditions shown in Table 3 to obtain hot-rolled steel sheets, and the hot-rolled steel sheets were coiled. Next, the hot-rolled steel sheets were pickled to remove scale from the surface of the steel sheet, and the thicknesses of the hot-rolled steel sheets were reduced by cold-rolling, thereby obtaining cold-rolled steel sheets having a thickness of 1.2 mm to 1.4 mm. Further, these cold-rolled steel sheets were annealed in a continuous annealing furnace at an annealing temperature shown in Table 4. On some of the cold-rolled steel sheets after the annealing, a hot-dip galvanized plating was formed during the cooling after soaking in the continuous annealing furnace. Further, some of the steel sheets on which the hot-clip galvanized plating was formed were galvannealed to form a galvannealed plating thereon. In addition, on some of the cold-rolled steel sheets after the annealing on which a hot-dip galvanized plating was not formed, an aluminum plating was formed. The steel sheets (both of the plated steel sheets and the non-plated steel sheets) obtained as above were temper-rolled. On some of the temper-rolled and non-plated steel sheets, an electrogalvanized plating was formed.

Figure 4:
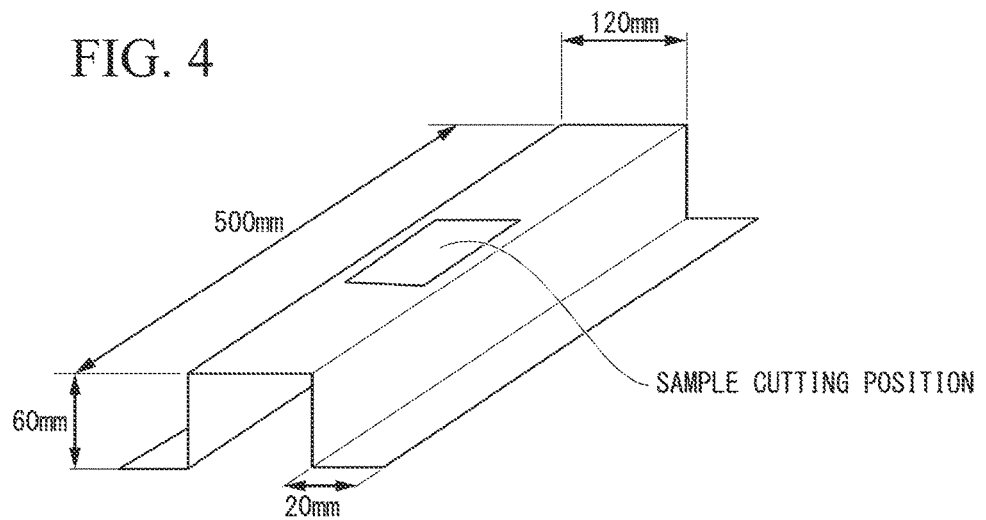
FIG. 4 is a perspective view showing a hot-stamp formed body according to an example of the invention.
Figure 5:
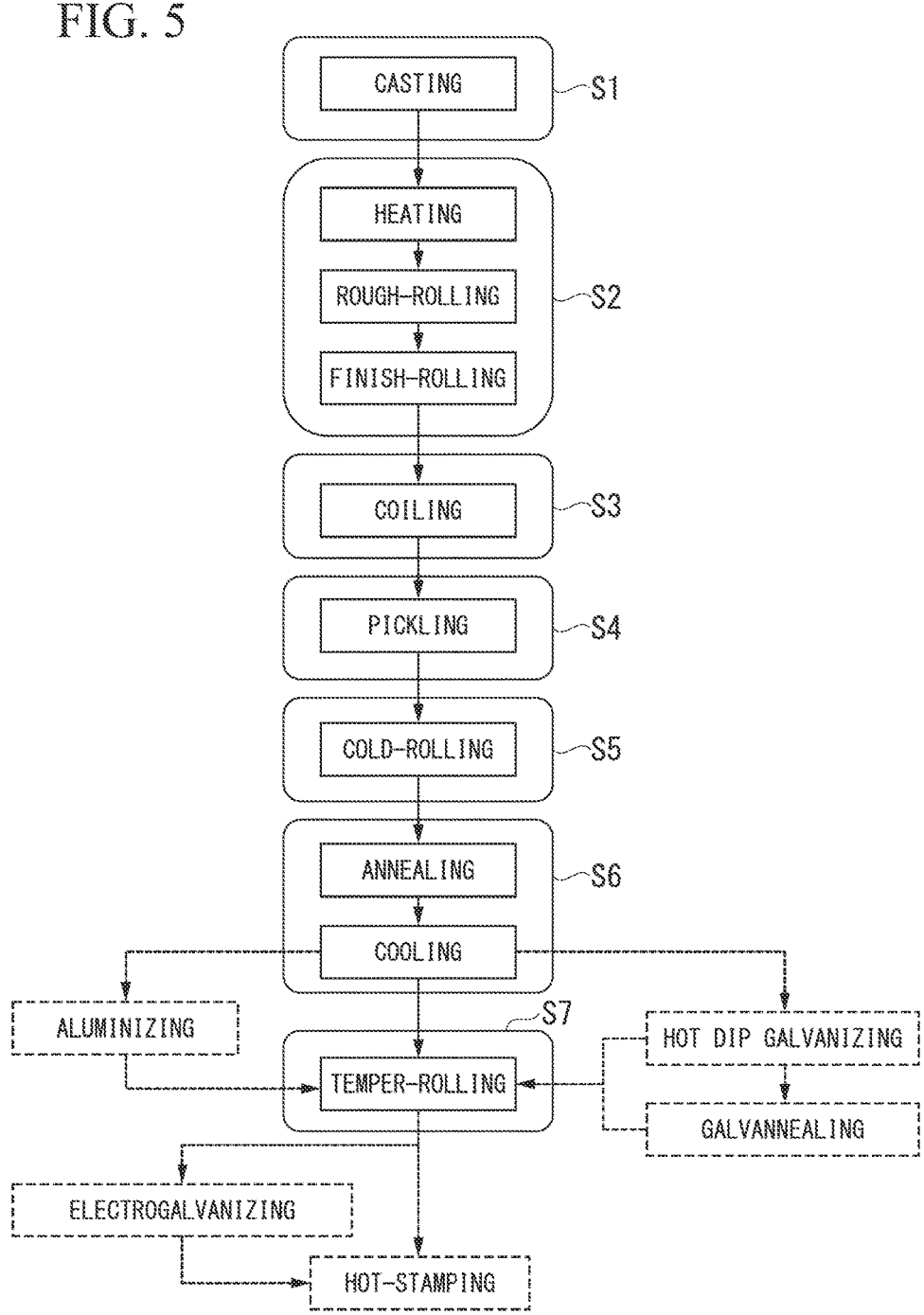
FIG. 5 is a flowchart showing a cold-rolled steel sheet according to the invention and a method for manufacturing various plated cold-rolled steel sheets.

Samples for evaluating material properties were collected from the various steel sheets obtained as above, and a material test, the hardness measurement of the retained austenite, and the measurement of the content of the structure were performed. As a result, regarding the steel sheets before hot-stamping, the tensile strength (TS), the ductility (El), the content of each structure, the hardness distribution of the retained austenite (the ratio H2/H1 of the average hardness of the thickness center portion to the average hardness of the thickness surface portion, and the hardness distribution σHM of the thickness center portion) were obtained. Next, in order to obtain a hot-stamp formed body having the form shown in FIG. 4, hot-stamping was performed in which each of the various steel sheets was heated at a temperature increase rate of 10° C./sec, was held at a heating temperature of 780° C. for 10 seconds, was hot-stamped, was cooled to 300° C. to 500° C. at a cooling rate of 100° C./sec, and was held at the temperature for 100 seconds or longer. From the formed body obtained as above, a sample was cut out at a position shown in FIG. 4 to perform the material test, the hardness measurement of the retained austenite and the measurement of the content of the structure. As a result, regarding the steel sheets after hot-stamping (hot-stamp formed bodies), the tensile strength (TS), the ductility (El), the content of each structure, the hardness distribution of the retained austenite (the ratio H2/H1 of the average hardness of the thickness center portion to the average hardness of the thickness surface portion, and the hardness distribution σHM of the thickness center portion) were obtained. The results are shown in Tables 5 to 8. In "Type of Plating" shown Tables 5 and 6, GI represents that a hot-dip galvanized plating was formed, GA represents that a galvannealed plating was formed, EG represents that an electrogalvanized plating was formed, and Al represents that an aluminum plating was formed. CR represents a non-plated steel sheet, that is, a cold-rolled steel sheet. "In Range" and "Out of Range" which are shown in the tables for the determination of numerical values (determination of pass-fail) indicate that the numerical value were in the range and were out of the range defined in the invention, respectively.

TABLE 1

| STEEL NUMBER | | C | Si | Mn | P | S | N | Al |
|---|---|---|---|---|---|---|---|---|
| A | EXAMPLE | 0.108 | 0.520 | 1.55 | 0.003 | 0.008 | 0.0035 | 0.035 |
| B | " | 0.111 | 0.820 | 1.61 | 0.023 | 0.006 | 0.0035 | 0.022 |
| C | " | 0.125 | 1.210 | 2.03 | 0.008 | 0.006 | 0.0034 | 0.042 |
| D | " | 0.133 | 1.020 | 1.62 | 0.007 | 0.007 | 0.0035 | 0.023 |
| E | " | 0.146 | 1.840 | 1.62 | 0.008 | 0.008 | 0.0045 | 0.034 |
| F | " | 0.155 | 1.220 | 1.84 | 0.006 | 0.009 | 0.0087 | 0.041 |
| G | " | 0.165 | 1.510 | 1.51 | 0.012 | 0.008 | 0.0056 | 0.033 |
| H | " | 0.175 | 1.33 | 1.66 | 0.051 | 0.001 | 0.0035 | 0.035 |
| I | " | 0.189 | 1.880 | 1.66 | 0.008 | 0.002 | 0.0065 | 0.041 |
| J | " | 0.190 | 1.120 | 1.62 | 0.007 | 0.008 | 0.0014 | 0.042 |
| K | " | 0.191 | 1.510 | 1.52 | 0.008 | 0.008 | 0.0026 | 0.034 |
| L | " | 0.192 | 1.320 | 2.11 | 0.012 | 0.006 | 0.0035 | 0.012 |
| M | " | 0.205 | 1.650 | 1.58 | 0.011 | 0.005 | 0.0032 | 0.025 |
| N | " | 0.208 | 1.450 | 2.41 | 0.009 | 0.008 | 0.0025 | 0.041 |
| O | " | 0.212 | 1.330 | 1.74 | 0.004 | 0.005 | 0.0041 | 0.037 |
| P | " | 0.225 | 1.541 | 2.45 | 0.005 | 0.008 | 0.0022 | 0.045 |
| Q | " | 0.226 | 1.894 | 1.84 | 0.011 | 0.003 | 0.0037 | 0.035 |
| R | " | 0.228 | 1.912 | 2.12 | 0.008 | 0.004 | 0.0015 | 0.035 |
| S | " | 0.234 | 1.335 | 1.86 | 0.013 | 0.007 | 0.0034 | 0.034 |
| T | " | 0.248 | 1.236 | 2.35 | 0.018 | 0.003 | 0.0029 | 0.031 |
| U | " | 0.256 | 1.645 | 2.21 | 0.011 | 0.003 | 0.0064 | 0.021 |
| W | " | 0.264 | 1.574 | 1.58 | 0.009 | 0.007 | 0.0012 | 0.036 |
| X | " | 0.280 | 1.561 | 1.87 | 0.013 | 0.003 | 0.0087 | 0.026 |
| Y | " | 0.284 | 1.021 | 2.44 | 0.009 | 0.007 | 0.0087 | 0.034 |
| Z | " | 0.291 | 1.351 | 2.31 | 0.008 | 0.004 | 0.0069 | 0.035 |
| AA | " | 0.175 | 1.210 | 1.85 | 0.010 | 0.005 | 0.0025 | 0.025 |
| AB | " | 0.185 | 1.230 | 1.84 | 0.011 | 0.005 | 0.0032 | 0.032 |
| AC | " | 0.111 | 1.133 | 1.95 | 0.008 | 0.003 | 0.0035 | 0.035 |
| AD | " | 0.140 | 1.325 | 1.95 | 0.008 | 0.004 | 0.0034 | 0.031 |
| AE | " | 0.168 | 1.222 | 1.99 | 0.008 | 0.002 | 0.0030 | 0.031 |
| AF | " | 0.222 | 1.532 | 1.85 | 0.008 | 0.002 | 0.0030 | 0.031 |
| AG | COMPARATIVE EXAMPLE | 0.029 | 0.321 | 1.55 | 0.007 | 0.003 | 0.0035 | 0.035 |
| AH | COMPARATIVE EXAMPLE | 0.312 | 0.512 | 2.15 | 0.003 | 0.006 | 0.0009 | 0.041 |
| AI | COMPARATIVE EXAMPLE | 0.102 | 0.005 | 2.12 | 0.007 | 0.009 | 0.0035 | 0.035 |
| AJ | COMPARATIVE EXAMPLE | 0.112 | 2.125 | 1.50 | 0.008 | 0.005 | 0.0034 | 0.026 |
| AK | COMPARATIVE EXAMPLE | 0.125 | 0.660 | 1.12 | 0.009 | 0.003 | 0.0032 | 0.029 |
| At | COMPARATIVE EXAMPLE | 0.125 | 0.050 | 3.12 | 0.007 | 0.004 | 0.0034 | 0.036 |
| AM | COMPARATIVE EXAMPLE | 0.131 | 1.520 | 2.05 | 0.071 | 0.003 | 0.0021 | 0.034 |
| AN | COMPARATIVE EXAMPLE | 0.102 | 0.125 | 2.50 | 0.002 | 0.021 | 0.0059 | 0.034 |
| AO | COMPARATIVE EXAMPLE | 0.111 | 0.265 | 1.52 | 0.011 | 0.009 | 0.0135 | 0.026 |
| AP | COMPARATIVE EXAMPLE | 0.144 | 0.012 | 2.39 | 0.007 | 0.004 | 0.0065 | 0.003 |
| AQ | COMPARATIVE EXAMPLE | 0.142 | 0.150 | 2.35 | 0.005 | 0.003 | 0.0035 | 0.085 |
| AR | COMPARATIVE EXAMPLE | 0.105 | 1.221 | 2.15 | 0.005 | 0.003 | 0.0030 | 0.032 |
| AS | COMPARATIVE EXAMPLE | 0.123 | 1.521 | 1.82 | 0.005 | 0.002 | 0.0041 | 0.025 |
| AT | COMPARATIVE EXAMPLE | 0.178 | 1.621 | 1.52 | 0.005 | 0.003 | 0.0020 | 0.025 |
| AU | COMPARATIVE EXAMPLE | 0.165 | 1.480 | 1.53 | 0.005 | 0.003 | 0.0020 | 0.025 |
| AV | COMPARATIVE EXAMPLE | 0.132 | 0.850 | 2.12 | 0.005 | 0.003 | 0.0020 | 0.024 |
| AW | COMPARATIVE EXAMPLE | 0.125 | 1.123 | 2.25 | 0.005 | 0.003 | 0.0015 | 0.031 |
| AX | COMPARATIVE EXAMPLE | 0.215 | 1.210 | 2.05 | 0.005 | 0.003 | 0.0020 | 0.025 |
| AY | COMPARATIVE EXAMPLE | 0.198 | 0.220 | 2.06 | 0.005 | 0.003 | 0.0020 | 0.025 |

SYMBOL "—" REPRESENTS THAT THE ELEMENT THEREOF IS NOT INTENTIONALLY INCLUDED.

TABLE 2

| STEEL NUMBER | | Cr | Mo | V | Ti | Nb | Ni | Cu | Ca | B | REM |
|---|---|---|---|---|---|---|---|---|---|---|---|
| A | EXAMPLE | — | — | — | — | — | — | — | — | — | — |
| B | " | — | — | — | — | — | — | — | — | — | — |
| C | " | 0.12 | — | — | — | — | 0.2 | — | — | 0.0012 | — |
| D | " | — | 0.15 | — | — | — | — | — | — | — | — |
| E | " | 0.21 | — | — | — | — | — | — | — | — | — |
| F | " | — | — | — | — | — | — | 0.4 | 0.004 | — | — |
| G | " | — | — | — | — | — | — | — | — | — | — |
| H | " | 0.32 | 0.05 | — | — | — | — | — | 0.003 | — | — |
| I | " | — | — | 0.03 | — | — | — | — | — | — | — |
| J | " | — | 0.31 | — | — | — | — | — | — | — | — |
| K | " | — | — | — | — | — | — | — | — | — | — |
| L | " | — | 0.21 | — | 0.05 | 0.05 | — | — | — | — | — |
| M | " | — | — | — | — | — | — | — | — | — | — |
| N | " | — | 0.31 | — | — | — | — | — | — | 0.0015 | — |
| O | " | — | — | — | — | — | — | — | — | — | 0.001 |
| P | " | 0.42 | — | — | — | 0.01 | — | — | — | — | — |
| Q | " | — | 0.11 | — | — | — | — | — | — | 0.001 | — |
| R | " | — | — | — | — | 0.03 | — | — | — | — | — |
| S | " | — | 0.12 | — | — | — | — | — | — | — | 0.0007 |
| T | " | — | — | — | 0.03 | — | — | — | — | — | — |
| U | " | — | 0.31 | — | — | — | — | — | — | 0.0008 | — |
| W | " | — | — | — | — | — | — | — | 0.002 | — | — |
| X | " | 0.15 | 0.11 | — | 0.05 | — | — | — | — | 0.0014 | 0.0005 |
| Y | " | 0.32 | — | — | — | — | — | — | — | 0.0015 | — |
| Z | " | — | 0.15 | 0.05 | — | — | — | — | — | — | — |
| AA | " | — | — | — | — | — | — | — | — | — | — |
| AB | " | — | — | — | — | — | — | — | — | — | — |
| AC | " | — | — | — | — | — | — | — | — | — | — |
| AD | " | — | — | — | — | — | — | — | — | — | — |
| AE | " | — | — | — | — | — | — | — | — | — | — |
| AF | " | — | — | — | — | — | — | — | — | — | — |
| AG | COMPARATIVE EXAMPLE | — | — | — | — | — | — | — | — | — | 0.0006 |
| AH | COMPARATIVE EXAMPLE | — | 0.15 | — | — | — | — | 0.2 | — | — | — |
| AI | COMPARATIVE EXAMPLE | — | 0.15 | — | — | — | — | — | — | 0.0012 | — |
| AJ | COMPARATIVE EXAMPLE | 0.28 | — | — | — | — | — | — | — | 0.0015 | — |
| AK | COMPARATIVE EXAMPLE | — | — | 0.04 | 0.02 | — | — | — | — | — | — |
| AL | COMPARATIVE EXAMPLE | — | — | — | — | — | — | — | — | — | — |
| AM | COMPARATIVE EXAMPLE | — | 0.15 | — | — | 0.03 | — | — | — | — | — |
| AN | COMPARATIVE EXAMPLE | 0.24 | — | — | — | — | 0.2 | — | — | — | — |
| AO | COMPARATIVE EXAMPLE | — | — | — | — | 0.02 | — | — | 0.003 | — | — |
| AP | COMPARATIVE EXAMPLE | — | 0.20 | — | — | — | — | — | — | — | — |
| AG | COMPARATIVE EXAMPLE | — | 0.22 | — | — | — | — | — | — | — | — |
| AR | COMPARATIVE EXAMPLE | — | 0.15 | — | — | — | — | — | — | — | — |
| AS | COMPARATIVE EXAMPLE | 0.24 | — | — | — | — | — | — | — | — | — |
| AT | COMPARATIVE EXAMPLE | — | — | — | — | — | — | — | — | — | — |
| AU | COMPARATIVE EXAMPLE | — | — | — | — | — | — | — | — | 0.001 | — |
| AV | COMPARATIVE EXAMPLE | 0.21 | — | — | — | — | — | — | — | — | — |
| AW | COMPARATIVE EXAMPLE | — | 0.15 | — | — | — | — | — | — | — | — |
| AX | COMPARATIVE EXAMPLE | — | — | — | — | 0.01 | — | — | — | — | — |
| AY | COMPARATIVE EXAMPLE | — | — | — | 0.01 | — | — | — | — | — | — |

SYMBOL "—" REPRESENTS THAT THE ELEMENT THEREOF IS NOT INTENTIONALLY INCLUDED.

TABLE 3

| STEEL NUMBER | EXAMPLE NUMBER | h1 | h2 | t1 | t2 | (EXPRESSION 3) | DETERMINATION |
|---|---|---|---|---|---|---|---|
| A | 1 | 250 | 35 | 300 | 50 | 4.2 | IN RANGE |
| B | 2 | 250 | 30 | 250 | 20 | 4.5 | IN RANGE |
| C | 3 | 200 | 28 | 400 | 150 | 4.8 | IN RANGE |
| D | 4 | 240 | 36 | 350 | 200 | 4.4 | IN RANGE |
| E | 5 | 230 | 35 | 300 | 100 | 4.0 | IN RANGE |
| F | 6 | 225 | 35 | 300 | 120 | 3.9 | IN RANGE |
| G | 7 | 255 | 35 | 300 | 160 | 4.6 | IN RANGE |
| H | 8 | 260 | 35 | 295 | 200 | 4.8 | IN RANGE |
| I | 9 | 250 | 35 | 300 | 140 | 4.4 | IN RANGE |
| J | 10 | 250 | 35 | 325 | 80 | 4.3 | IN RANGE |
| K | 11 | 245 | 35 | 300 | 70 | 4.1 | IN RANGE |
| L | 12 | 250 | 35 | 420 | 65 | 4.6 | IN RANGE |
| M | 13 | 250 | 35 | 300 | 125 | 4.4 | IN RANGE |
| N | 14 | 265 | 35 | 440 | 130 | 5.1 | IN RANGE |
| O | 15 | 250 | 35 | 300 | 356 | 5.0 | IN RANGE |
| P | 18 | 252 | 35 | 260 | 410 | 5.1 | IN RANGE |
| Q | 17 | 250 | 35 | 300 | 100 | 4.3 | IN RANGE |
| R | 18 | 250 | 35 | 500 | 100 | 4.9 | IN RANGE |
| S | 19 | 285 | 35 | 550 | 100 | 5.7 | IN RANGE |
| T | 20 | 250 | 35 | 100 | 20 | 3.0 | IN RANGE |
| U | 21 | 263 | 35 | 60 | 20 | 2.8 | IN RANGE |
| W | 22 | 250 | 35 | 80 | 15 | 2.8 | IN RANGE |
| X | 23 | 302 | 35 | 120 | 200 | 4.9 | IN RANGE |
| Y | 24 | 250 | 35 | 300 | 100 | 4.3 | IN RANGE |
| Z | 25 | 250 | 35 | 300 | 100 | 4.3 | IN RANGE |
| AA | 26 | 250 | 35 | 300 | 100 | 4.3 | IN RANGE |
| AB | 27 | 250 | 35 | 300 | 100 | 4.3 | IN RANGE |
| AG | 28 | 250 | 35 | 300 | 100 | 4.3 | IN RANGE |
| AD | 29 | 250 | 35 | 300 | 100 | 4.3 | IN RANGE |
| AE | 30 | 250 | 35 | 300 | 100 | 4.3 | IN RANGE |
| AF | 31 | 250 | 35 | 300 | 100 | 4.3 | IN RANGE |
| AG | 32 | 250 | 35 | 250 | 100 | 4.2 | IN RANGE |
| AH | 33 | 250 | 35 | 380 | 80 | 4.4 | IN RANGE |
| AI | 34 | 250 | 35 | 520 | 100 | 4.9 | IN RANGE |
| AJ | 35 | 250 | 35 | 260 | 80 | 4.1 | IN RANGE |
| AK | 38 | 250 | 35 | 300 | 100 | 4.3 | IN RANGE |
| AL | 37 | 250 | 35 | 350 | 300 | 5.0 | IN RANGE |
| AM | 38 | 250 | 35 | 420 | 200 | 4.9 | IN RANGE |
| AN | 39 | 250 | 35 | 290 | 100 | 4.3 | IN RANGE |
| AO | 40 | 250 | 35 | 300 | 100 | 4.3 | IN RANGE |
| AP | 41 | 250 | 35 | 320 | 150 | 4.5 | IN RANGE |
| AQ | 42 | 250 | 35 | 300 | 100 | 4.3 | IN RANGE |
| AR | 43 | 250 | 35 | 500 | 20 | 4.7 | IN RANGE |
| AS | 44 | 250 | 35 | 260 | 45 | 4.0 | IN RANGE |
| AT | 45 | 250 | 35 | 300 | 100 | 4.3 | IN RANGE |
| AU | 46 | 250 | 35 | 700 | 620 | 6.2 | OUT OF RANGE |
| AV | 47 | 250 | 35 | 820 | 560 | 6.3 | OUT OF RANGE |
| AW | 48 | 250 | 35 | 15 | 5 | 1.8 | OUT OF RANGE |
| AX | 49 | 250 | 35 | 300 | 50 | 4.2 | IN RANGE |
| AY | 50 | 250 | 35 | 250 | 100 | 4.2 | IN RANGE |

TABLE 4

| STEEL NUMBER | EXAMPLE NUMBER | r1 | r2 | r3 | r | LEFT SIDE OF EXPRESSION 4 | DETERMINATION | ANNEALING TEMPERATURE (° C.) |
|---|---|---|---|---|---|---|---|---|
| A | 1 | 35 | 30 | 20 | 60 | 1.8 | IN RANGE | 750 |
| B | 2 | 30 | 34 | 19 | 62 | 1.7 | IN RANGE | 746 |
| C | 3 | 26 | 30 | 20 | 65 | 1.5 | IN RANGE | 735 |
| D | 4 | 25 | 24 | 20 | 51 | 1.7 | IN RANGE | 745 |
| E | 5 | 24 | 22 | 18 | 72 | 1.1 | IN RANGE | 775 |
| F | 6 | 32 | 28 | 20 | 71 | 1.4 | IN RANGE | 777 |
| G | 7 | 30 | 32 | 20 | 68 | 1.5 | IN RANGE | 782 |
| H | 8 | 26 | 24 | 20 | 70 | 1.3 | IN RANGE | 756 |
| I | 9 | 32 | 30 | 25 | 65 | 1.7 | IN RANGE | 778 |
| J | 10 | 30 | 33 | 25 | 67 | 1.6 | IN RANGE | 792 |
| K | 11 | 31 | 32 | 28 | 60 | 1.9 | IN RANGE | 761 |
| L | 12 | 31 | 20 | 21 | 58 | 1.6 | IN RANGE | 745 |
| M | 13 | 28 | 32 | 19 | 52 | 1.9 | IN RANGE | 738 |
| N | 14 | 26 | 25 | 20 | 64 | 1.4 | IN RANGE | 745 |
| O | 15 | 27 | 28 | 20 | 67 | 1.4 | IN RANGE | 756 |
| P | 16 | 26 | 28 | 20 | 59 | 1.6 | IN RANGE | 785 |
| Q | 17 | 29 | 26 | 19 | 55 | 1.7 | IN RANGE | 777 |

TABLE 4-continued

| STEEL NUMBER | EXAMPLE NUMBER | r1 | r2 | r3 | r | LEFT SIDE OF EXPRESSION 4 | DETERMINATION | ANNEALING TEMPERATURE (° C.) |
|---|---|---|---|---|---|---|---|---|
| R | 18 | 28 | 24 | 20 | 50 | 1.8 | IN RANGE | 746 |
| S | 19 | 32 | 29 | 18 | 56 | 1.8 | IN RANGE | 729 |
| T | 20 | 21 | 26 | 18 | 50 | 1.6 | IN RANGE | 785 |
| U | 21 | 28 | 22 | 20 | 48 | 1.8 | IN RANGE | 746 |
| W | 22 | 26 | 18 | 10 | 45 | 1.6 | IN RANGE | 832 |
| X | 23 | 20 | 19 | 12 | 52 | 1.2 | IN RANGE | 800 |
| Y | 24 | 21 | 24 | 12 | 44 | 1.6 | IN RANGE | 814 |
| Z | 25 | 18 | 18 | 12 | 40 | 1.5 | IN RANGE | 836 |
| AA | 26 | 25 | 26 | 20 | 65 | 1.4 | IN RANGE | 790 |
| AB | 27 | 28 | 25 | 19 | 52 | 1.7 | IN RANGE | 775 |
| AC | 28 | 32 | 30 | 21 | 55 | 1.9 | IN RANGE | 746 |
| AD | 29 | 25 | 26 | 19 | 54 | 1.6 | IN RANGE | 746 |
| AE | 30 | 18 | 17 | 12 | 50 | 1.2 | IN RANGE | 774 |
| AF | 31 | 26 | 28 | 20 | 62 | 1.5 | IN RANGE | 746 |
| AG | 32 | 38 | 42 | 26 | 82 | 1.6 | IN RANGE | 768 |
| AH | 33 | 28 | 25 | 18 | 42 | 2.1 | IN RANGE | 779 |
| AI | 34 | 35 | 36 | 28 | 65 | 1.9 | IN RANGE | 739 |
| AJ | 35 | 34 | 36 | 20 | 62 | 1.8 | IN RANGE | 789 |
| AK | 36 | 33 | 36 | 29 | 59 | 2.1 | IN RANGE | 784 |
| AL | 37 | 36 | 35 | 28 | 58 | 2.1 | IN RANGE | 746 |
| AM | 38 | 30 | 32 | 19 | 62 | 1.7 | IN RANGE | 812 |
| AN | 39 | 32 | 35 | 25 | 65 | 1.8 | IN RANGE | 826 |
| AO | 40 | 35 | 34 | 29 | 62 | 2.0 | IN RANGE | 785 |
| AP | 41 | 34 | 36 | 22 | 48 | 2.4 | IN RANGE | 845 |
| AQ | 42 | 30 | 28 | 18 | 40 | 2.4 | IN RANGE | 775 |
| AR | 43 | 30 | 32 | 19 | 50 | 2.0 | IN RANGE | 912 |
| AS | 44 | 28 | 20 | 18 | 42 | 2.0 | IN RANGE | 885 |
| AT | 45 | 26 | 25 | 15 | 45 | 1.9 | IN RANGE | 665 |
| AU | 46 | 31 | 32 | 20 | 52 | 2.0 | IN RANGE | 778 |
| AV | 47 | 30 | 29 | 20 | 55 | 1.8 | IN RANGE | 774 |
| AW | 48 | 31 | 32 | 24 | 54 | 2.0 | IN RANGE | 771 |
| AX | 49 | 12 | 15 | 11 | 55 | 0.9 | OUT OF RANGE | 781 |
| AY | 50 | 14 | 13 | 10 | 61 | 0.8 | OUT OF RANGE | 771 |

TABLE 5

| STEEL NUMBER | EXAMPLE NUMBER | TS (Mpa) | EL (%) | TS × EL | AFTER ANNEALING AND TEMPER-ROLLING AND BEFORE HOT-STAMPING | | | | | AREA RATIO OF PEARLITE BEFORE COLD-ROLLING (%) | TYPE OF PLATING |
|---|---|---|---|---|---|---|---|---|---|---|---|
| | | | | | AREA RATIO OF FERRITE (%) | AREA RATIO OF MARTENSITE (%) | VOLUME RATIO OF RETAINED AUSTENITE (%) | AREA RATIO OF BAINITE (%) | AREA RATIO OF PEARLITE (%) | | |
| A | 1 | 471 | 43.5 | 20489 | 80 | 0 | 11 | 0 | 9 | 33 | CR |
| B | 2 | 485 | 41.5 | 20128 | 71 | 0 | 10 | 12 | 7 | 26 | GA |
| C | 3 | 512 | 33.7 | 20326 | 74 | 0 | 11 | 5 | 10 | 31 | GI |
| D | 4 | 555 | 37.5 | 20813 | 66 | 0 | 9 | 20 | 5 | 22 | EG |
| E | 5 | 591 | 34.1 | 20153 | 66 | 0 | 8 | 20 | 6 | 56 | AI |
| F | 6 | 601 | 33.6 | 20194 | 78 | 0 | 7 | 15 | 0 | 60 | CR |
| G | 7 | 604 | 35.2 | 21261 | 69 | 0 | 10 | 11 | 10 | 75 | CR |
| H | 8 | 612 | 38.0 | 22032 | 67 | 0 | 10 | 13 | 10 | 37 | GA |
| I | 9 | 614 | 34.8 | 21367 | 70 | 0 | 8 | 13 | 9 | 41 | GA |
| J | 10 | 617 | 35.1 | 21657 | 69 | 0 | 12 | 19 | 0 | 27 | GA |
| K | 11 | 621 | 34.8 | 21611 | 72 | 0 | 10 | 18 | 0 | 33 | GA |
| L | 12 | 633 | 33.0 | 20889 | 70 | 0 | 13 | 10 | 7 | 13 | GI |
| M | 13 | 634 | 32.4 | 20542 | 47 | 0 | 12 | 31 | 10 | 9 | GA |
| N | 14 | 640 | 32.0 | 20480 | 50 | 0 | 11 | 30 | 9 | 40 | GA |
| O | 15 | 653 | 31.0 | 20243 | 60 | 0 | 14 | 25 | 1 | 31 | GI |
| P | 16 | 668 | 31.4 | 20912 | 63 | 0 | 8 | 28 | 1 | 23 | GA |
| Q | 17 | 671 | 30.5 | 20466 | 46 | 0 | 9 | 40 | 5 | 31 | GA |
| R | 18 | 681 | 29.5 | 20090 | 47 | 0 | 8 | 38 | 7 | 46 | CR |
| S | 19 | 712 | 29.0 | 20648 | 42 | 0 | 10 | 48 | 0 | 32 | GA |
| T | 20 | 745 | 28.5 | 21233 | 38 | 0 | 9 | 53 | 0 | 19 | GI |
| U | 21 | 782 | 26.7 | 20879 | 35 | 5 | 11 | 48 | 1 | 22 | EG |
| W | 22 | 812 | 25.7 | 20868 | 39 | 8 | 10 | 45 | 0 | 20 | GA |
| X | 23 | 988 | 21.5 | 21242 | 35 | 5 | 9 | 51 | 0 | 42 | AI |
| Y | 24 | 1012 | 20.6 | 20847 | 35 | 6 | 8 | 50 | 1 | 42 | GA |
| Z | 25 | 1252 | 18.9 | 23663 | 33 | 10 | 10 | 47 | 0 | 15 | CR |
| AA | 26 | 622 | 34.2 | 21272 | 70 | 0 | 8 | 22 | 0 | 40 | GA |
| AB | 27 | 625 | 32.4 | 20250 | 72 | 1 | 7 | 10 | 10 | 35 | CR |
| AC | 28 | 598 | 33.6 | 20093 | 74 | 2 | 6 | 18 | 0 | 20 | GA |
| AD | 29 | 615 | 32.7 | 20111 | 75 | 0 | 8 | 14 | 3 | 9 | EG |

TABLE 5-continued

| | | | | | AFTER ANNEALING AND TEMPER-ROLLING AND BEFORE HOT-STAMPING | | | | | | |
|---|---|---|---|---|---|---|---|---|---|---|---|
| STEEL NUMBER | EXAMPLE NUMBER | TS (Mpa) | EL (%) | TS × EL | AREA RATIO OF FERRITE (%) | AREA RATIO OF MARTENSITE (%) | VOLUME RATIO OF RETAINED AUSTENITE (%) | AREA RATIO OF BAINITE (%) | AREA RATIO OF PEARLITE (%) | AREA RATIO OF PEARLITE BEFORE COLD-ROLLING (%) | TYPE OF PLATING |
| AE | 30 | 628 | 32.1 | 20159 | 80 | 0 | 7 | 13 | 0 | 66 | GI |
| AF | 31 | 687 | 32.0 | 21984 | 74 | 0 | 6 | 20 | 0 | 22 | AI |
| AG | 32 | 326 | 41.9 | 13659 | 90 | 0 | 3 | 2 | 5 | 2 | GA |
| AH | 33 | 1512 | 8.9 | 13457 | 5 | 75 | 15 | 1 | 4 | 3 | GA |
| AI | 34 | 635 | 22.5 | 14288 | 71 | 19 | 8 | 2 | 0 | 40 | GA |
| AJ | 35 | 625 | 31.2 | 19500 | 75 | 10 | 14 | 1 | 0 | 19 | GA |
| AK | 36 | 705 | 26.0 | 18330 | 42 | 10 | 7 | 25 | 16 | 3 | GI |
| AL | 37 | 795 | 15.6 | 12402 | 42 | 8 | 8 | 10 | 32 | 15 | GI |
| AM | 38 | 784 | 19.1 | 14974 | 51 | 12 | 9 | 9 | 19 | 16 | GI |
| AN | 39 | 602 | 30.5 | 18361 | 68 | 15 | 8 | 7 | 2 | 35 | GI |
| AO | 40 | 586 | 27.4 | 16056 | 69 | 16 | 7 | 6 | 2 | 20 | EG |
| AP | 41 | 1254 | 7.5 | 9405 | 11 | 2 | 8 | 11 | 68 | 22 | AI |
| AQ | 42 | 1480 | 9.6 | 14208 | 12 | 5 | 9 | 16 | 58 | 6 | GA |
| AR | 43 | 1152 | 17.2 | 19814 | 16 | 15 | 8 | 32 | 29 | 3 | EG |
| AS | 44 | 1412 | 10.2 | 14402 | 42 | 35 | 9 | 12 | 2 | 5 | AI |
| AT | 45 | 1355 | 10.0 | 13550 | 41 | 5 | 3 | 15 | 36 | 1 | GA |
| AU | 46 | 1152 | 12.0 | 13824 | 41 | 18 | 8 | 23 | 10 | 7 | GA |
| AV | 47 | 1012 | 13.4 | 13561 | 42 | 16 | 7 | 30 | 5 | 15 | GA |
| AW | 48 | 965 | 15.6 | 15054 | 43 | 15 | 6 | 30 | 6 | 21 | GI |
| AX | 49 | 852 | 16.0 | 13632 | 80 | 0 | 6 | 2 | 12 | 5 | GA |
| AY | 50 | 1355 | 6.0 | 8130 | 48 | 19 | 6 | 40 | 30 | 1 | GI |

TABLE 6

| | | | | | | | AFTER HOT-STAMPING | | | |
|---|---|---|---|---|---|---|---|---|---|---|
| STEEL NUMBER | EXAMPLE NUMBER | TS (Mpa) | EL (%) | TS × EL | AREA RATIO OF FERRITE (%) | AREA RATIO OF MARTENSITE (%) | VOLUME RATIO OF RETAINED AUSTENITE (%) | AREA RATIO OF BAINITE (%) | AREA RATIO OF PEARLITE (%) | TYPE OF PLATING |
| A | 1 | 421 | 48.6 | 20461 | 87 | 0 | 10 | 3 | 0 | CR |
| B | 2 | 457 | 45.9 | 20976 | 76 | 0 | 12 | 8 | 4 | GA |
| C | 3 | 524 | 38.2 | 20017 | 75 | 0 | 10 | 15 | 0 | GI |
| D | 4 | 574 | 36.2 | 20779 | 74 | 0 | 9 | 15 | 2 | EG |
| E | 5 | 591 | 34.0 | 20094 | 69 | 0 | 10 | 21 | 0 | AI |
| F | 6 | 612 | 34.1 | 20869 | 82 | 0 | 11 | 7 | 0 | CR |
| G | 7 | 615 | 33.3 | 20480 | 75 | 0 | 12 | 13 | 0 | CR |
| H | 8 | 641 | 32.0 | 20512 | 80 | 0 | 8 | 12 | 0 | GA |
| I | 9 | 795 | 25.3 | 20114 | 56 | 0 | 9 | 35 | 0 | GA |
| J | 10 | 801 | 26.3 | 21066 | 55 | 0 | 10 | 35 | 0 | GA |
| K | 11 | 841 | 25.4 | 21361 | 50 | 0 | 10 | 35 | 5 | GA |
| L | 12 | 912 | 22.5 | 20520 | 45 | 5 | 12 | 35 | 3 | GI |
| M | 13 | 975 | 20.6 | 20085 | 50 | 5 | 11 | 30 | 4 | GA |
| N | 14 | 992 | 21.5 | 21328 | 52 | 6 | 9 | 33 | 0 | GA |
| O | 15 | 1007 | 20.5 | 20644 | 48 | 3 | 10 | 39 | 0 | GI |
| P | 16 | 1012 | 20.1 | 20341 | 42 | 0 | 8 | 50 | 0 | GA |
| Q | 17 | 1023 | 20.0 | 20460 | 46 | 0 | 9 | 45 | 0 | GA |
| R | 18 | 1031 | 21.2 | 21857 | 51 | 4 | 10 | 35 | 0 | CR |
| S | 19 | 1055 | 20.5 | 21628 | 52 | 5 | 10 | 33 | 0 | GA |
| T | 20 | 1125 | 18.5 | 20813 | 41 | 3 | 10 | 46 | 0 | GI |
| U | 21 | 1185 | 19.2 | 22752 | 42 | 4 | 8 | 46 | 0 | EG |
| W | 22 | 1201 | 18.4 | 22098 | 43 | 8 | 9 | 40 | 0 | GA |
| X | 23 | 1224 | 16.8 | 20686 | 41 | 10 | 10 | 39 | 0 | AI |
| Y | 24 | 1342 | 15.8 | 21204 | 41 | 12 | 8 | 39 | 0 | GA |
| Z | 25 | 1482 | 13.8 | 20452 | 41 | 18 | 8 | 31 | 2 | CR |
| AA | 26 | 812 | 25.6 | 20787 | 52 | 0 | 9 | 36 | 3 | GA |
| AB | 27 | 1001 | 20.1 | 20120 | 45 | 0 | 8 | 44 | 3 | CR |
| AC | 28 | 1012 | 20.0 | 20240 | 50 | 0 | 7 | 43 | 0 | GA |
| AD | 29 | 1024 | 19.7 | 20173 | 44 | 5 | 6 | 45 | 0 | EG |
| AE | 30 | 1032 | 19.5 | 20124 | 51 | 3 | 6 | 40 | 0 | GI |
| AF | 31 | 1188 | 17.8 | 21146 | 42 | 0 | 10 | 48 | 0 | AI |
| AG | 32 | 474 | 32.5 | 15405 | 95 | 0 | 3 | 2 | 0 | GA |
| AH | 33 | 1812 | 8.5 | 15402 | 4 | 90 | 6 | 0 | 0 | GA |
| AI | 34 | 794 | 18.5 | 14689 | 60 | 17 | 8 | 15 | 0 | GA |
| AJ | 35 | 1012 | 16.5 | 18698 | 55 | 19 | 7 | 19 | 0 | GA |
| AK | 36 | 1021 | 14.2 | 14498 | 45 | 16 | 8 | 31 | 0 | GI |
| AL | 37 | 1012 | 15.6 | 15787 | 45 | 10 | 9 | 32 | 4 | GI |
| AM | 38 | 1015 | 18.2 | 18473 | 51 | 10 | 6 | 20 | 13 | GI |
| AN | 39 | 1121 | 16.8 | 18833 | 50 | 6 | 8 | 11 | 25 | GI |
| AO | 40 | 579 | 30.5 | 17660 | 48 | 8 | 7 | 6 | 31 | EG |
| AP | 41 | 1312 | 10.5 | 13776 | 12 | 68 | 9 | 11 | 0 | AI |
| AQ | 42 | 1521 | 11.4 | 17339 | 11 | 69 | 8 | 12 | 0 | GA |
| AR | 43 | 1025 | 16.2 | 18605 | 14 | 15 | 8 | 32 | 31 | EG |
| AS | 44 | 1421 | 10.4 | 14778 | 42 | 37 | 9 | 12 | 0 | AI |
| AT | 45 | 1332 | 12.6 | 16783 | 41 | 19 | 2 | 15 | 23 | GA |
| AU | 46 | 1232 | 12.4 | 15277 | 41 | 4 | 6 | 40 | 9 | GA |
| AV | 47 | 1110 | 16.0 | 17780 | 42 | 10 | 7 | 40 | 1 | GA |
| AW | 48 | 1056 | 14.3 | 15101 | 43 | 5 | 6 | 40 | 6 | GI |
| AX | 49 | 995 | 13.5 | 13433 | 52 | 15 | 8 | 25 | 0 | GA |
| AY | 50 | 1332 | 9.4 | 12521 | 41 | 19 | 6 | 30 | 4 | GI |

TABLE 7

| STEEL NUMBER | EXAMPLE NUMBER | LEFT SIDE OF EXPRESSION 1 BEFORE HOT-STAMPING | DETERMINATION | LEFT SIDE OF EXPRESSION 1 AFTER HOT-STAMPING | DETERMINATION |
|---|---|---|---|---|---|
| A | 1 | 1.02 | IN RANGE | 1.03 | IN RANGE |
| B | 2 | 1.03 | IN RANGE | 1.03 | IN RANGE |
| C | 3 | 1.02 | IN RANGE | 1.00 | IN RANGE |
| D | 4 | 1.03 | IN RANGE | 1.04 | IN RANGE |
| E | 5 | 1.06 | IN RANGE | 1.05 | IN RANGE |
| F | 6 | 1.07 | IN RANGE | 1.02 | IN RANGE |
| G | 7 | 1.08 | IN RANGE | 1.08 | IN RANGE |
| H | 8 | 1.06 | IN RANGE | 1.06 | IN RANGE |
| I | 9 | 1.04 | IN RANGE | 1.09 | IN RANGE |
| J | 10 | 1.03 | IN RANGE | 1.02 | IN RANGE |
| K | 11 | 1.02 | IN RANGE | 1.03 | IN RANGE |

TABLE 7-continued

| STEEL NUMBER | EXAMPLE NUMBER | LEFT SIDE OF EXPRESSION 1 BEFORE HOT-STAMPING | DETERMINATION | LEFT SIDE OF EXPRESSION 1 AFTER HOT-STAMPING | DETERMINATION |
|---|---|---|---|---|---|
| L | 12 | 1.04 | IN RANGE | 1.02 | IN RANGE |
| M | 13 | 1.06 | IN RANGE | 1.05 | IN RANGE |
| N | 14 | 1.08 | IN RANGE | 1.07 | IN RANGE |
| O | 15 | 1.08 | IN RANGE | 1.06 | IN RANGE |
| P | 16 | 1.02 | IN RANGE | 1.05 | IN RANGE |
| Q | 17 | 1.05 | IN RANGE | 1.06 | IN RANGE |
| R | 18 | 1.01 | IN RANGE | 1.03 | IN RANGE |
| S | 19 | 1.07 | IN RANGE | 1.07 | IN RANGE |
| T | 20 | 1.06 | IN RANGE | 1.07 | IN RANGE |
| U | 21 | 1.09 | IN RANGE | 1.09 | IN RANGE |
| W | 22 | 1.05 | IN RANGE | 1.08 | IN RANGE |
| X | 23 | 1.07 | IN RANGE | 1.09 | IN RANGE |
| Y | 24 | 1.06 | IN RANGE | 1.06 | IN RANGE |
| Z | 25 | 1.04 | IN RANGE | 1.03 | IN RANGE |
| AA | 26 | 1.02 | IN RANGE | 1.03 | IN RANGE |
| AB | 27 | 1.01 | IN RANGE | 1.04 | IN RANGE |
| AC | 28 | 1.05 | IN RANGE | 1.06 | IN RANGE |
| AD | 29 | 1.06 | IN RANGE | 1.03 | IN RANGE |
| AE | 30 | 1.04 | IN RANGE | 1.04 | IN RANGE |
| AF | 31 | 1.05 | IN RANGE | 1.05 | IN RANGE |
| AG | 32 | 1.14 | OUT OF RANGE | 1.15 | OUT OF RANGE |
| AH | 33 | 1.23 | OUT OF RANGE | 1.18 | OUT OF RANGE |
| AI | 34 | 1.21 | OUT OF RANGE | 1.23 | OUT OF RANGE |
| AJ | 35 | 1.02 | IN RANGE | 1.05 | IN RANGE |
| AK | 36 | 0.36 | OUT OF RANGE | 0.45 | OUT OF RANGE |
| AL | 37 | 1.25 | OUT OF RANGE | 1.37 | OUT OF RANGE |
| AM | 38 | 1.23 | OUT OF RANGE | 1.31 | OUT OF RANGE |
| AN | 39 | 1.32 | OUT OF RANGE | 1.33 | OUT OF RANGE |
| AO | 40 | 1.05 | IN RANGE | 1.04 | IN RANGE |
| AP | 41 | 1.21 | OUT OF RANGE | 1.16 | OUT OF RANGE |
| AQ | 42 | 1.03 | IN RANGE | 1.04 | IN RANGE |
| AR | 43 | 1.05 | IN RANGE | 1.08 | IN RANGE |
| AS | 44 | 1.03 | IN RANGE | 1.06 | IN RANGE |
| AT | 45 | 1.06 | IN RANGE | 1.07 | IN RANGE |
| AU | 46 | 1.02 | IN RANGE | 1.04 | IN RANGE |
| AV | 47 | 1.02 | IN RANGE | 1.01 | IN RANGE |
| AW | 48 | 1.05 | IN RANGE | 1.06 | IN RANGE |
| AX | 49 | 1.18 | OUT OF RANGE | 1.21 | OUT OF RANGE |
| AY | 50 | 1.11 | OUT OF RANGE | 1.12 | OUT OF RANGE |

TABLE 8

| STEEL NUMBER | EXAMPLE NUMBER | LEFT SIDE OF EXPRESSION 2 BEFORE HOT-STAMPING | DETERMINATION | LEFT SIDE OF EXPRESSION 2 AFTER HOT-STAMPING | DETERMINATION |
|---|---|---|---|---|---|
| A | 1 | 18 | IN RANGE | 16 | IN RANGE |
| B | 2 | 18 | IN RANGE | 19 | IN RANGE |
| C | 3 | 4 | IN RANGE | 3 | IN RANGE |
| D | 4 | 19 | IN RANGE | 18 | IN RANGE |
| E | 5 | 14 | IN RANGE | 14 | IN RANGE |
| F | 6 | 15 | IN RANGE | 14 | IN RANGE |
| G | 7 | 10 | IN RANGE | 9 | IN RANGE |
| H | 8 | 8 | IN RANGE | 8 | IN RANGE |
| I | 9 | 7 | IN RANGE | 5 | IN RANGE |
| J | 10 | 12 | IN RANGE | 11 | IN RANGE |
| K | 11 | 13 | IN RANGE | 16 | IN RANGE |
| L | 12 | 15 | IN RANGE | 16 | IN RANGE |
| M | 13 | 16 | IN RANGE | 11 | IN RANGE |
| N | 14 | 13 | IN RANGE | 14 | IN RANGE |
| O | 15 | 12 | IN RANGE | 11 | IN RANGE |
| P | 16 | 10 | IN RANGE | 16 | IN RANGE |
| Q | 17 | 15 | IN RANGE | 11 | IN RANGE |
| R | 18 | 17 | IN RANGE | 16 | IN RANGE |
| S | 19 | 18 | IN RANGE | 18 | IN RANGE |
| T | 20 | 10 | IN RANGE | 11 | IN RANGE |
| U | 21 | 10 | IN RANGE | 6 | IN RANGE |
| W | 22 | 6 | IN RANGE | 6 | IN RANGE |
| X | 23 | 5 | IN RANGE | 8 | IN RANGE |
| Y | 24 | 10 | IN RANGE | 10 | IN RANGE |
| Z | 25 | 15 | IN RANGE | 17 | IN RANGE |

TABLE 8-continued

| STEEL NUMBER | EXAMPLE NUMBER | LEFT SIDE OF EXPRESSION 2 BEFORE HOT-STAMPING | DETERMINATION | LEFT SIDE OF EXPRESSION 2 AFTER HOT-STAMPING | DETERMINATION |
|---|---|---|---|---|---|
| AA | 26 | 18 | IN RANGE | 18 | IN RANGE |
| AB | 27 | 18 | IN RANGE | 10 | IN RANGE |
| AC | 28 | 19 | IN RANGE | 18 | IN RANGE |
| AD | 29 | 18 | IN RANGE | 15 | IN RANGE |
| AE | 30 | 16 | IN RANGE | 19 | IN RANGE |
| AF | 31 | 18 | IN RANGE | 18 | IN RANGE |
| AG | 32 | 24 | OUT OF RANGE | 21 | OUT OF RANGE |
| AH | 33 | 25 | OUT OF RANGE | 25 | OUT OF RANGE |
| AI | 34 | 22 | OUT OF RANGE | 26 | OUT OF RANGE |
| AJ | 35 | 11 | IN RANGE | 11 | IN RANGE |
| AK | 36 | 31 | OUT OF RANGE | 30 | OUT OF RANGE |
| AL | 37 | 32 | OUT OF RANGE | 31 | OUT OF RANGE |
| AM | 38 | 27 | OUT OF RANGE | 28 | OUT OF RANGE |
| AN | 39 | 26 | OUT OF RANGE | 30 | OUT OF RANGE |
| AO | 40 | 12 | IN RANGE | 11 | IN RANGE |
| AP | 41 | 21 | OUT OF RANGE | 25 | OUT OF RANGE |
| AQ | 42 | 16 | IN RANGE | 16 | IN RANGE |
| AR | 43 | 19 | IN RANGE | 19 | IN RANGE |
| AS | 44 | 16 | IN RANGE | 16 | IN RANGE |
| AT | 45 | 15 | IN RANGE | 15 | IN RANGE |
| AU | 48 | 15 | IN RANGE | 15 | IN RANGE |
| AV | 47 | 17 | IN RANGE | 17 | IN RANGE |
| AW | 48 | 16 | IN RANGE | 16 | IN RANGE |
| AX | 49 | 16 | IN RANGE | 15 | IN RANGE |
| AY | 50 | 18 | IN RANGE | 14 | IN RANGE |

It can be seen from the above examples that, when the requirements of the invention are satisfied, a high-strength cold-rolled steel sheet, a high-strength hot-dip galvanized cold-rolled steel sheet, a high-strength galvannealed cold-rolled steel sheet, an electrogalvanized cold-rolled steel sheet, or an aluminized cold-rolled steel sheet for hot-stamping which is superior can be obtained in which TS×EL≥20000 MPa·% is satisfied before and after hot-stamping.

BRIEF DESCRIPTION OF THE REFERENCE SYMBOLS

S1: Casting
S2: Hot-Rolling
S3: Coiling
S4: Pickling
S5: Cold-Rolling
S6: Annealing
S7: Temper-Rolling

The invention claimed is:

1. A cold-rolled steel sheet having a chemical composition comprising, in terms of mass %:
C: 0.1% to 0.3%;
Si: 0.01% to 2.0%;
Mn: 1.5% to 2.5%;
P: 0.001% to 0.6 %;
S: 0.001% to 0.01%;
N: 0.0005% to 0.01%;
Al: 0.01% to 0.05%;
B: 0% to 0.002%;
Mo: 0% to 0.5%;
Cr: 0% to 0.5%;
V: 0% to 0.1%;
Ti: 0% to 0.1%;
Nb: 0% to 0.05%;
Ni: 0% to 1.0%;
Cu: 0% to 1.0%;
Ca: 0% to 0.005%;
REM: 0% to 0.005%; and
rest including Fe and impurities, wherein
a structure before and after a hot-stamping includes
a ferrite: 30 area % to 90 area %,
a martensite: 0 area % or more and less than 20 area %,
a pearlite: 0 area % to 10 area %,
a retained austenite: 5 volume % to 20 volume %, and
a rest structure: a bainite,
a hardness of the retained austenite measured with a nano indenter before and after the hot-stamping satisfies Expression 1 and Expression 2,
a tensile strength and a ductility satisfy a relation of TS×El≥20000 MPa·%, $$H2/H1<1.1: \qquad \text{Expression 1,}$$

$$\sigma HM<20: \qquad \text{Expression 2,}$$

and
the "H1" represents the hardness of the retained austenite existing within a thickness surface portion before and after the hot-stamping, the thickness surface portion being an area within 200 μm in the thickness direction of a surface of the cold-rolled steel sheet, the "H2" represents the hardness of the retained austenite existing within a thickness center portion before and after the hot-stamping, the thickness center portion being an area within ±100 μm along the thickness direction of a center plane of the cold-rolled steel sheet in the thickness direction, the "σHM" represents a variance of the hardness of the retained austenite within the thickness center portion before or after the hot-stamping, "TS" represents the tensile strength of the cold-rolled steel sheet in terms of MPa, and "El" represents the ductility of the cold-rolled steel sheet in terms of %.

2. The cold-rolled steel sheet according to claim 1, wherein
the chemical composition includes one or more elements selected from a group consisting of, in terms of mass %:
B: 0.0005% to 0.002%;
Mo: 0.01% to 0.5%;
Cr: 0.01% to 0.5%;
V: 0.001% to 0.1%;
Ti: 0.001% to 0.1%;
Nb: 0.001% to 0.05%;
Ni: 0.01% to 1.0%;
Cu: 0.01% to 1.0%;
Ca: 0.0005% to 0.005%; and
REM: 0.0005% to 0.005%.

3. The cold-rolled steel sheet according to claim 1, wherein
a hot-dip galvanized plating is formed on the surface of the cold-rolled steel sheet.

4. The cold-rolled steel sheet according to claim 1, wherein
a galvannealed plating is formed on the surface of the cold-rolled steel sheet.

5. The cold-rolled steel sheet according to claim 1, wherein
an electrogalvanized plating is formed on the surface of the cold-rolled steel sheet.

6. The cold-rolled steel sheet according to claim 1, wherein
an aluminum plating is formed on the surface of the cold-rolled steel sheet.

7. A method for manufacturing the cold-rolled steel sheet according to claim 1, comprising:
casting a molten steel having the chemical composition into a steel;
hot-rolling after the casting, in which heating is performed on the steel in a furnace, and then rough-rolling and finish-rolling are performed on the steel under a condition satisfying Expression 3;
coiling the steel after the hot-rolling;
pickling the steel after the coiling;
cold-rolling the steel after the pickling with a cold-rolling mill having a plurality of stands under a condition satisfying Expression 4;
annealing after the cold-rolling, in which annealing is performed on the steel at 700° C. to 850° C., and then the steel is cooled;
temper-rolling the steel after the annealing, wherein $$2<(1/5)\times(h1/h2)\times(1/10)\times(t1+t2)^{0.3}<6: \quad \text{Expression 3,}$$

$$1.5\times(r1/r)+1.2\times(r2/r)+(r3/r)>1: \quad \text{Expression 4,}$$

and
"h1" represents a thickness of the steel before the rough-rolling in terms of mm, "h2" represents the thickness of the steel after the rough-rolling in terms of mm, "t1" represents a duration from a time at which the steel exits the furnace to a time at which the rough-rolling of the steel starts in terms of seconds, "t2" represents a duration from a time at which the rough-rolling is finished to a time at which the finish-rolling starts in terms of seconds, and "ri" represents an individual target cold-rolling reduction of an $i_{th}$ stand (i=1, 2, 3 . . . ) from a first stand along the plurality of the stands in terms of %, and "r" represents a total target cold-rolling reduction in the cold-rolling in terms of %.

8. The method according to claim 7 for manufacturing the cold-rolled steel sheet according to claim 3, further comprising
hot-dip galvanizing between the annealing and the temper-rolling, in which the hot-dip galvanized plating is formed on the steel.

9. The method according to claim 8 for manufacturing the cold-rolled steel sheet according to claim 4, further comprising
galvannealing between the hot-dip galvanizing and the temper-rolling, in which the steel is galvannealed.

10. The method according to claim 7 for manufacturing the cold-rolled steel sheet according to claim 5, further comprising
electrogalvanizing after the temper-rolling, in which the electrogalvanized plating is formed on the steel.

11. The method according to claim 7 for manufacturing the cold-rolled steel sheet according to claim 6, further comprising
aluminizing between the annealing and the temper-rolling, in which the aluminum plating is formed on the steel.

12. A hot-stamp formed body obtained by using the cold-rolled steel sheet according to claim 1.

13. A hot-stamp formed body obtained by using the cold-rolled steel sheet according to claim 2.

14. A hot-stamp formed body obtained by using the cold-rolled steel sheet according to claim 3.

15. A hot-stamp formed body obtained by using the cold-rolled steel sheet according to claim 4.

16. A hot-stamp formed body obtained by using the cold-rolled steel sheet according to claim 5.

17. A hot-stamp formed body obtained by using the cold-rolled steel sheet according to claim 6.

* * * * *

UNITED STATES PATENT AND TRADEMARK OFFICE
CERTIFICATE OF CORRECTION

PATENT NO. : 10,072,324 B2
APPLICATION NO. : 14/419290
DATED : September 11, 2018
INVENTOR(S) : Toshiki Nonaka et al.

It is certified that error appears in the above-identified patent and that said Letters Patent is hereby corrected as shown below:

In the Claims

Column 31, Line 56: "0.6%" should be replaced with -- 0.06% --

Signed and Sealed this
Eighteenth Day of June, 2019

Andrei Iancu
*Director of the United States Patent and Trademark Office*